(12) United States Patent
Albrecht et al.

(10) Patent No.: US 11,210,268 B2
(45) Date of Patent: Dec. 28, 2021

(54) SCALABLE SPACE-TIME DENSITY DATA FUSION

(71) Applicant: International Business Machines Corporation, Armonk, NY (US)

(72) Inventors: Conrad M. Albrecht, White Plains, NY (US); Marcus O. Freitag, Sleepy Hollow, NY (US); Hendrik F. Hamann, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 229 days.

(21) Appl. No.: 15/816,357

(22) Filed: Nov. 17, 2017

(65) Prior Publication Data

US 2019/0057110 A1 Feb. 21, 2019

Related U.S. Application Data

(63) Continuation of application No. 15/680,850, filed on Aug. 18, 2017.

(51) Int. Cl.
*G06F 16/17* (2019.01)
*G06F 16/13* (2019.01)
*G06F 16/29* (2019.01)

(52) U.S. Cl.
CPC ............ *G06F 16/173* (2019.01); *G06F 16/13* (2019.01); *G06F 16/29* (2019.01)

(58) Field of Classification Search
CPC ......... G06F 16/173; G06F 16/13; G06F 16/29
See application file for complete search history.

(56) References Cited

U.S. PATENT DOCUMENTS

| | | | |
|---|---|---|---|
| 5,487,139 A | * | 1/1996 | Saylor .................... G06T 11/00 345/629 |
| 6,134,338 A | | 10/2000 | Solberg et al. |
| | | (Continued) | |

FOREIGN PATENT DOCUMENTS

| | | |
|---|---|---|
| CN | 105787457 A | 7/2016 |
| CN | 108681715 A | 10/2018 |
| | (Continued) | |

OTHER PUBLICATIONS

International Search Report and Written Opinion for International Application No. PCT/IB2018/056117; International Filing Date Aug. 15, 2018; dated May 14, 2019; 9 pages.

(Continued)

*Primary Examiner* — Kannan Shanmugasundaram
(74) *Attorney, Agent, or Firm* — Cantor Colburn LLP; Erik Johnson

(57) ABSTRACT

A database system includes a processing sub-system having an electronic hardware controller that receives first formatted data, and an electronic file formatting sub-system having an electronic hardware controller that assigns coordinate values corresponding to a second data format to the first formatted data. The file formatting sub-system generates a dual-format data file that fuses together the first formatted data with the coordinate values corresponding to a second data format. The database system further includes a storage sub-system having a data storage unit configured to store the dual-format data file.

12 Claims, 12 Drawing Sheets

(56) References Cited

U.S. PATENT DOCUMENTS

| | | | |
|---|---|---|---|
| 6,396,492 | B1 | 5/2002 | Frisken et al. |
| 6,674,445 | B1 | 1/2004 | Chithambaram et al. |
| 7,352,892 | B2 | 4/2008 | Zhang et al. |
| 7,426,455 | B1 | 9/2008 | Antony |
| 7,965,902 | B1 | 6/2011 | Zelinka et al. |
| 8,018,458 | B2 | 9/2011 | Peterson |
| 8,175,332 | B2 | 5/2012 | Harrington |
| 8,179,393 | B2 | 5/2012 | Minear et al. |
| 8,340,360 | B2 | 12/2012 | Chen et al. |
| 8,582,808 | B2 | 11/2013 | Mclaughlin et al. |
| 8,989,434 | B1 | 3/2015 | Reinhardt et al. |
| 9,082,188 | B2 | 7/2015 | Mueller et al. |
| 9,235,334 | B2 | 1/2016 | Geis |
| 9,436,784 | B2 | 9/2016 | Cunningham |
| 9,589,238 | B2 | 3/2017 | Nugent |
| 9,842,282 | B2 | 12/2017 | Liu et al. |
| 10,372,705 | B2 | 8/2019 | Bermudez Rodriguez et al. |
| 10,410,091 | B2 | 9/2019 | Albrecht et al. |
| 2004/0225665 | A1 | 11/2004 | Toyama et al. |
| 2005/0206657 | A1 | 9/2005 | Arcas |
| 2005/0234991 | A1 | 10/2005 | Marx et al. |
| 2005/0270288 | A1 | 12/2005 | Arcas |
| 2006/0265197 | A1 | 11/2006 | Peterson |
| 2006/0271281 | A1 | 11/2006 | Ahn et al. |
| 2007/0064005 | A1* | 3/2007 | Antoine ............. G06F 16/29 345/473 |
| 2008/0046184 | A1 | 2/2008 | Bortolot et al. |
| 2009/0022359 | A1 | 1/2009 | Kang et al. |
| 2009/0089017 | A1 | 4/2009 | Kelley |
| 2009/0287702 | A1 | 11/2009 | Pascucci |
| 2011/0001850 | A1 | 1/2011 | Gaubatz et al. |
| 2011/0055290 | A1 | 3/2011 | Li et al. |
| 2011/0128288 | A1 | 6/2011 | Petrou et al. |
| 2011/0202539 | A1* | 8/2011 | Salemann ............. G06F 16/29 707/741 |
| 2012/0066005 | A1* | 3/2012 | Stewart ............. G06Q 30/0282 705/4 |
| 2012/0281907 | A1 | 11/2012 | Samples et al. |
| 2014/0156806 | A1 | 6/2014 | Karpistsenko et al. |
| 2014/0375678 | A1 | 12/2014 | Kjeldergaard et al. |
| 2015/0193630 | A1 | 7/2015 | Von Kaenel et al. |
| 2015/0310618 | A1 | 10/2015 | Heege |
| 2015/0317511 | A1 | 11/2015 | Li et al. |
| 2015/0371420 | A1 | 12/2015 | Yerushalmy et al. |
| 2016/0005145 | A1 | 1/2016 | Seitz et al. |
| 2016/0171302 | A1 | 6/2016 | Lavigne et al. |
| 2016/0249040 | A1 | 8/2016 | Mesher |
| 2016/0299910 | A1 | 10/2016 | Mokbel et al. |
| 2016/0379388 | A1 | 12/2016 | Rasco et al. |
| 2017/0011089 | A1 | 1/2017 | Bermudez Rodriguez et al. |
| 2017/0032509 | A1 | 2/2017 | Mannar et al. |
| 2017/0277951 | A1 | 9/2017 | Wagner et al. |
| 2017/0323028 | A1 | 11/2017 | Jonker et al. |
| 2018/0189954 | A1 | 7/2018 | Albrecht et al. |
| 2018/0217233 | A1 | 8/2018 | Lee |
| 2018/0293671 | A1 | 10/2018 | Murr et al. |
| 2019/0050687 | A1 | 2/2019 | Albrecht et al. |
| 2019/0057109 | A1 | 2/2019 | Albrecht et al. |
| 2020/0151272 | A1 | 5/2020 | Freitag et al. |
| 2020/0151504 | A1 | 5/2020 | Albrecht et al. |

FOREIGN PATENT DOCUMENTS

| | | |
|---|---|---|
| JP | H06230767 A | 8/1994 |
| JP | H11258976 A | 9/1999 |
| JP | 2003157287 A | 5/2003 |
| JP | 2006267228 A | 10/2006 |
| WO | 2008060746 A2 | 5/2008 |
| WO | 2019034999 A2 | 2/2019 |
| WO | 2019115873 A1 | 6/2019 |

OTHER PUBLICATIONS

Klein, LJ, et al.; "Pairs: A scalable Geo-Spatial Data Analytics Platforms" 2015, 9 pages.

Lee, C.H., et al., "Method and System for Providing a Real Time Query Recommendation System", Dec. 5, 2014, 6 pages.

Quantum; "Improving Geospatial Information Workflows", Feb. 2014, 2 pages.

Trevisiol, M. et al.; "A Method and System for Retrieving Geo-Location of Media Content with a Hierarchical Divide and Conquer Approach", Aug. 22, 2014, 12 pages.

List of IBM Patents or Patent Applictions Treated as Related; (Appendix P), Filed Nov. 17, 2017, 2 pages.

Conrad M. Albrecht, et al., "Scalable Space-Time Density Data Fusion", U.S. Appl. No. 15/680,850, filed Aug. 18, 2017.

Bodas-Salcedo et al. "COSP: Satellite simulation software for model assessment." Bulletin of the American Meteorological Society 92.8 (2011): 1023.

IBM "List of IBM Patents or Patent Applictions Treated as Related; (Appendix P)", Filed Aug. 3, 2020, 2 pages.

Albrecht, Conrad M. et al., "Detecting Artifacts Based On Digital Signatures", U.S. Appl. No. 15/673,947, filed Aug. 10, 2017.

Albrecht, Conrad M. et al., "Distributed Vector-Raster Fusion", U.S. Appl. No. 16/727,445, filed Dec. 26, 2019.

Albrecht, Conrad M. et al., "Efficient Querying Using Overview Layers of Geospatial-Temporal Data in a Data Analytics Platform", U.S. Appl. No. 16/188,964, filed May 14, 2020.

Albrecht, Conrad M. et al., "Scalable Feature Classification for Laser Scanning Data and Digital Elevation Models", U.S. Appl. No. 16/186,237, filed Nov. 9, 2018.

Ostir, "Remote sensing in archaeology—from optical to lidar." ISA SUmmer School, Tours (2007): 25-30.

Jasiewicz et al., "Geo-spatial modelling with unbalanced data: modelling the spatial pattern of human activity during the Stone Age." Open Geosciences 7.1 (2015).

ArcGIS for Desktop "Raster Pyramids", ArcMap 10.3; retrieved at: https://desktop.arcgis.com/en/arcmap/10.3/manage-data/raster-and-images/raster-pyramids; on Jun. 18, 2020; 4 pgs.

ArcGIS Online "ArcGIS Online" retrieved at: https://www.arcgis.com/index.html 6/; downloaded Jun. 22, 2020; 2 pgs.

Bermudez Rodriguez et al., "Parallel Querying of Adjustable Resolution Geospatial Database", U.S. Appl. No. 15/096,218, filed Apr. 11, 2016.

Bewley, R.H. "New light on an ancient landscape: lidar surveyh in the Stonehenge World Heritage Site", Abstract Only, Antiquity; vol. 79, Issue 305, Sep. 2005; pp. 636-647; 4 pgs.

Boehm et al. "XZ-Ordering: A Space-Filling Curve for Objects with Spatial Extension" International Symposium on Spatial Databases; Conference Paper; SSD 1999: Advances in Spatial Databases, pp. 75-90; First Online Jun. 25, 1999; retrieved at: https://link.springer.com/chapter/10.1007%2F3-540-48482-5_7; 7 pgs.

Commandre, B. et al. "Manhole Cover Localization in Aerial Images With a Deep Learning Approach", The Int'l Archives of the Photogrammetry, Remote Sensing and Spatial Information Sciences, vol. XLII-1/W1, 2017; ISPRS Hannover Workshop, Jun. 6-9, 2017; pp. 333-338.

Doneus, Michael et al. "Archaeological prospection of forested areas using full-waveform airborne laser scanning", Abstract Only, In Journal of Archeological Science, vol. 35, Issue 4; Apr. 2008, pp. 882-893; 3 pgs.

Fisher, Christopher T., et al. "Identifying Ancient Settlement Patterns through LiDAR in the Mosquitia Region of Honduras", PLOS One; Research Article; DOI:10.1371/journal.pone.0159890; Aug. 25, 2016; 37 pgs.

Gastellu-Etchegorry et al. "Discrete Anisotropic Radiative Transfer (DART 5) for modeling airborne and satellite spectroradiometer and LIDAR acquisitions of natural and urban landscapes." Remote Sensing 7.2 (2015): 1667-1701.

GeoServer "GeoServer is an open source server for sharing geospatial data", retrieved at: http://geoserver.org/; downloaded Jun. 22, 2020; 4 pgs.

GitHub "geopandas" Python tools for geographic data; retrieved at: https://github.com/geopandas/geopandas; downloaded Jun. 22, 2020; 6 pgs.

(56) References Cited

OTHER PUBLICATIONS

GitHub "GeoWave User Guide" retrieved at: http://locationtech.github.io/geowave/userguide.html; downloaded Jun. 18, 2020; 35 pgs.
GitHub IBM/ibmpairs: open source tools for interaction with IBM Pairs' retrieved at: https://github.com/IBM/ibmpairs; downloaded Jun. 22, 2020; 3 pgs.
GitHub "jupyter-incubator / sparkmagic", retrieved at: https://github.com/jupyter-incubator/sparkmagic; downloaded Jun. 22, 2020; 7 pgs.
GitHub "locationtech / geomesa: GeoMesa is a suite of tools for working with big geo-spatial . . . " retrieved at: https://github.com/locationtech/geomesa; downloaded Jun. 22, 2020; 5 pgs.
GitHub "NumPy", retrieved at: https://github.com/numpy; downloaded Jun. 22, 2020; 4 pgs.
GitHub "PDAL Release 2.1.0 Changes of Note", released Mar. 20, 2020; retrieved at: https://github.com/PDAL/PDAL/releases; 16 pgs.
Google Earth Engine "A planetary-scale platform for Each science data & analysis", retrieved at: https://earthengine.google.com/; downloaded Jun. 22, 2020; 6 pgs.
Guyot, Alexandre et al. "Detecting Neolithic Burial Mounds from LiDAR-Derived Elevation Data Using a Multi-Scale Approach and Machine Learning Techniques", Remote Sensing at www.mdpi.com/journal/remotesensing; 2018, 10, 225; Published: Feb. 1, 2018; 19 pgs.
Harmon, James M. et al. "Lidar for Archaeological Landscape Analysis: A Case Study of Two Eighteenth-Century Maryland Plantation Sites", Abstract Only, American Antiquity 71(4): 649; Oct. 2006; 12 pgs.
Holben et al. "AERONE—A federated instrument network and data archive for aerosol characterization." Remote sensing of environment 66.1 (1998): 1-16.
IBMPairs PyPI "ibmpairs 0.1.1 pip install ibmpairs", open source Python modules for the IBM Pairs Geoscope platform; retrieved at: https://pypi.org/project/ibmpairs/6/; released Mar. 17, 2020, 5 pgs.
Kim, J. et al. "A Trail Detection Using Convolutional Neural Network" Abstract Only, Proceedings of the 7th International Conference on Emerging Databases. Lecture Notes in Electrical Engineering, (2018) vol. 461; 4 pgs.
Lasaponara, R., et al. "Flights into the past: full-waveform airborne laser scanning data for archeological investigation", Abstract Only 3 pgs.; Journal of Archeological Science; vol. 38, Issue 9, Sep. 2011, pp. 2061-2070.
Marketsandmarkets "Geospatial Analytics Market Worth 86.32 Billion USD by 2023", retrieved at: https://www.marketsandmarkets.com/PressReleases/geospatial-analytics.asp; downloaded Jun. 22, 2020; 7 pgs.
Pajic, Vladimir "Model of Point Cloud Data Management System in Big Data Paradigm", International Journal of Geo-Information, ISPRS Int. J. Geo-Inf. 2018, 7, 265; www.mdpi.com/journal/ijgi; 15 pgs.
QGIS "A Free and Open Source Geographic Information System", retrieved at: https://qgis.org/en/site/ 6/; downloaded Jun. 22, 2020; 6 pgs.
Simonyan, Karen et al. "Very Deep Convolutional Networks for Large-Scale Image Recognition", Published as a conference paper at ICLR 2015; 14 pgs.
The Imaging & Geospatial Information Society "LAS Specification 1.4—R14", retrieved at: http://www.asprs.org/wp-content/uploads/2019/03/LAS_1_4_r14.pdf; Version Approved Nov. 2011; revised Mar. 26, 2019; 50 pgs.
The Library of Congress "The Contextual Query Language", SRU Search/Retrieval via URL; sru version 1.2 specs; retrieved at: https://www.loc.gov/standards/sru/cql/; downloaded Jun. 22, 2020; 2 pgs.
Trier, Oivind Due et al. "Automatic Detection of Pit Structures in Airborne Laser Scanning Data", Abstract Only, Archaeological Prospection Research Article; First Published: Apr. 4, 2012, https://doi.org/10.1002/arp.1421; 4 pgs.
U.S. Non-Provisional Patent Application entitled "Predicting and Correcting Vegetation State", U.S. Appl. No. 16/658,533, filed Oct. 21, 2019.
Gilvear et al., "Detection of estuarine and tidal river hydromorphology using hyper-spectral and LiDAR data: Forth estuary, Scotland." Estuarine, Coastal and Shelf Science 61.3 (2004): 379-392.
Verhoeven, Geert Julien "Near-Infrared Aerial Crop Mark Archaeology: From its Historical Use to Current Digital Implementations" Abstract Only; Journal of Archeological Method and Theory, Vo. 19, No. 1 (Mar. 2012), pp. 132-160; retrieved at: https://www.jstor.org/stable/41408811?seq=1; downloaded on Jun. 18, 2020; 3 pgs.
Wikipedia "DigitalGlobe", retrieved at: https://en.wikipedia.org/wiki/DigitalGlobe; downloaded Jun. 22, 2020; 5 pgs.
Wikipedia "Lidar" retrieved at: https://en.wikipedia.org/wiki/Lidar; downloaded Jun. 22, 2020; 17 pgs.
Wikipedia "Minimum spanning tree", retrieved at: https://en.wikipedia.org/wiki/Minimum_spanning_tree; downloaded Jun. 22, 2020; 7 pgs.
Wikipedia "National Elevation Dataset", retrieved at: https://en.wikipedia.org/wiki/National_Elevation_Dataset; downloaded Jun. 22, 2020; 2 pgs.
Wikipedia "Project Jupyter", retrieved at: https://en.wikipedia.org/wiki/Project_Jupyter; downloaded Jun. 22, 2020; 7 pgs.
Wikipedia "Sentinel-1", retrieved at: https://en.wikipedia.org/wiki/Sentinel-1; downloaded Jun. 22, 2020; 8 pgs.
Wikipedia "Well-known text representation of Geometry" retrieved at: https://en.wikipedia.org/wiki/Well-known_text_representation_of_geometry; downloaded Jun. 22, 2020; 7 pgs.
Wikipedia "Esri", retrieved at: https://en.wikipedia.org/wiki/Esri; downloaded Jun. 22, 2020; 5 pgs.
Winter, Stephen et al. "Topology in Raster and Vector Representation" retrieved at: https://www.researchgate.net/publication/220387767; GeoInformatica 4:1, 35-65 (2000); 32 pgs.
Xie, Dong et al. "Simba: Efficient In-Memory Spatial Analytics", SIGMOD'16, Jun. 26-Jul. 1, 2016, San Francisco, CA, USA; pp. 1071-1085.
International Search Report and Written Opinion issued in International Application No. PCT/IB2020/058917; Application Filing Date Sep. 24, 2020; dated Dec. 30, 2020 (7 pages).
Office Action issued in Japanese Application No. 2020-508531; Application Filing Date Aug. 15, 2018; dated Sep. 15, 2021 (12 pages).

\* cited by examiner

SCALABLE SPACE-TIME DENSITY DATA FUSION

DOMESTIC PRIORITY

This application is a continuation of U.S. patent application Ser. No. 15/680,850, filed Aug. 18, 2017, the disclosure of which is incorporated by reference herein in its entirety.

BACKGROUND

The present invention relates in general to database systems, and more particularly to processing high volume data in database systems.

Spatial datasets can represent properties of a geographical entity (e.g. a building, lake, mountain or township, etc.) such as position, associated timestamp, size, etc. Moreover, continuous quantities such as, for example, temperature, wind, speed, etc., can be indexed in space and time. One might categorize geo-spatial data into two types: "raster" and "vector". The former corresponds to a (regular) grid of geo-spatial coordinates that have corresponding values associated with, for example, light reflection intensities of a satellite image. The latter refers to single coordinates, or a linear, irregular, open/closed sequence of those that have associated values such as, for example, irregularly distributed weather stations measuring temperature, roads with a given traffic density or counties with a given (average) population density.

Spatial data systems such as, for example, a geographic information system (GIS), can take geographical or spatial datasets that have different projections and resolutions (in case of raster data), and display them as overlapping layers. Several computational iterations and re-projections on multiple layers of the datasets are typically performed to obtain overlapping alignment. The overlapped datasets are then stored on a hard disk drive or in a relational database, which can quickly be filled with vast amounts of data. The analysis of such large amounts of data, in particular that of their intercorrelation in space and time, is sometimes referred to as "Big (Geo-Spatial) Data Analytics."

SUMMARY

Embodiments of the present invention are directed to a database system. The database system includes a processing sub-system having an electronic hardware controller that receives first formatted data, and an electronic file formatting sub-system having an electronic hardware controller that assigns coordinate values corresponding to a second data format to the first formatted data. The file formatting sub-system generates a dual-format data file that fuses together the first formatted data with the coordinate values corresponding to a second data format. The database system further includes a storage sub-system having a data storage unit configured to store the dual-format data file Embodiments of the present invention are directed to a computer-implemented method of operating a database system.

A non-limiting example computer-implemented method of operating a database system includes receiving first formatted data at a processing sub-system including an electronic hardware controller, and assigning, using an electronic file formatting sub-system, coordinate values corresponding to a second data format to the first formatted data. The method further includes generating, using the file formatting sub-system, a dual-format data file that correlates the first formatted data with the coordinate values corresponding to a second data format, and storing, in a data storage unit, the dual-format data file.

Another non-limiting computer-implemented method of operating a database system is provided to generate a query result. The method comprises assigning, via a file formatting sub-system including an electronic hardware controller, coordinate values corresponding to a first data format (raster) to data objects included in an initial data set having a second data format (vector) different from the first data format. The method further includes generating a dual-format data file, using the file formatting sub-system that correlates the data objects having the second data format with the coordinate values corresponding to the first data format to generate a dual-format data file. The method further includes storing, in a data storage unit, the dual-format data file, and receiving a query for at least one data object included in the initial data set. The at least one data object has the second data format. The method further includes identifying at least one dual-format data file that includes the at least one data object having the second data format from a plurality of dual-data files stored in the data storage unit, and outputting the at least one data object based on the corresponding coordinate values stored in the at least one dual-format data file.

Another non-limiting computer-implemented method of operating a database system to generate a query result is provided. The method includes overlaying a plurality of raster grid cells on an initial vector data set using a processing sub-system including an electronic hardware controller. Each raster grid cell having assigned thereto a set of grid coordinates. The method further includes generating, via a file formatting sub-system implemented with an electronic hardware controller, a fused data file including both a selected set of grid coordinates corresponding to at least one raster grid cell that overlays a vector object included in the vector data set, and object identification information identifying the vector object. The method further includes receiving a query for at least one target vector object included in the vector data set. The method further includes performing, via a processing sub-system including an electronic hardware controller, an image recognition operation that determines a reference vector object based on the target vector object, and determines at least one set of grid coordinates corresponding to the vector object based on a comparison between the reference vector object and the plurality of grid cells. The method further includes outputting the object identification information from the fused data file that stores the selected set of grid coordinates.

Another non-limiting computer-implemented method of operating a database to generate a query result is provided. The method includes generating, via a processing sub-system including an electronic hardware controller, a grid system including a plurality of grid cells, and overlaying, the grid cells on an initial data set having a first data format. Each grid cell representing data having a second data format and having assigned thereto a set of grid coordinates. The method further includes assigning, via a file formatting sub-system including an electronic hardware controller, coordinate values corresponding to the second data format (raster) to data objects included in an initial data set having the first data format (vector). The method further includes storing, in a dual-format data file, identification information of a selected data object having the first format with a selected set of coordinates corresponding to a selected grid cell that overlies the selected data object. The method further includes receiving a query for at least one target data object having the second data format, and generating a reference data object having the first data format based on the query. The method further includes outputting the at least one target data object having the second data format based on a comparison between the reference data object and the plurality of grid cells.

Another non-limiting embodiment provides a computer program product for operating a database system. The computer program product comprises a computer readable storage medium having program instructions embodied therewith. The program instructions are executable by a processing circuit to cause the processing circuit to receive formatted data to a processing sub-system including an electronic hardware controller, and to assign, using an electronic file formatting sub-system, coordinate values corresponding to a second data format to the first formatted data, via a file formatting sub-system. The instructions are further executable to generate, using the file formatting sub-system, a dual-format data file that correlates the first formatted data with the coordinate values corresponding to a second data format, and to store, in a data storage unit, the dual-format data file.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of one or more embodiments of the invention are apparent from the following detailed description taken in conjunction with the accompanying drawings in which:

Figure 1:
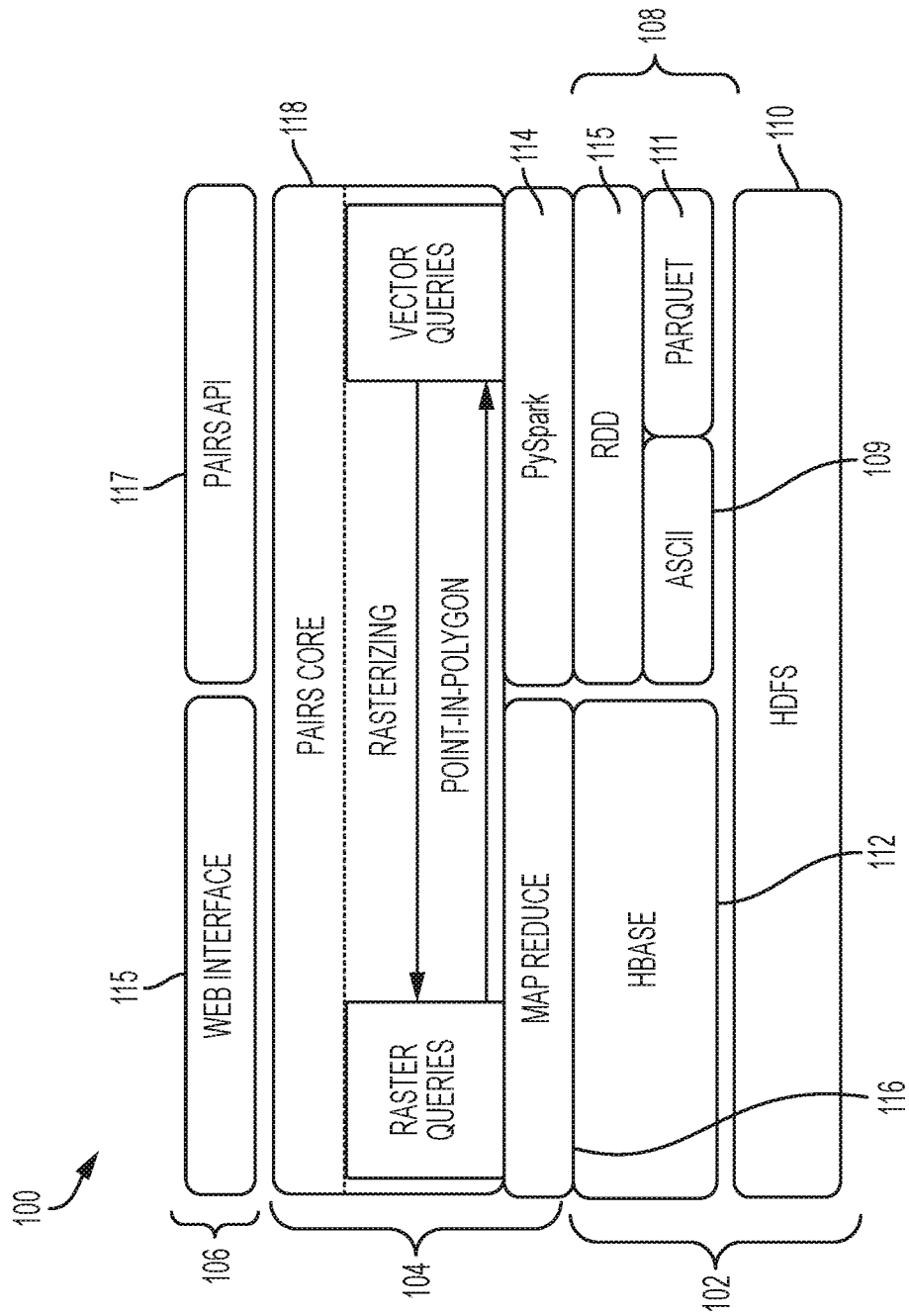
FIG. 1 depicts a block diagram of a database system according to embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

For the sake of brevity, conventional techniques related to database processing and analytics may or may not be described in detail herein. Moreover, the various operations and process steps described herein can be incorporated into a more comprehensive procedure or process having additional steps or functionality not described in detail herein. For example, some data analytical operations such as image recognition are well known and so, in the interest of brevity, many conventional steps will only be mentioned briefly herein or will be omitted entirely without providing the well-known process details.

Turning now to an overview of technologies that are more specifically relevant to aspects of various non-limiting embodiments of the invention, global analytics of geospatial information from various sources such as satellites, weather stations, Light Detection and Ranging (LiDAR) scanning, surveys, etc. requires processing of vast amounts of data (e.g., terabytes to petabytes of data). For example, the National Aeronautics and Space Administration's (NASA's) Landsat 8 satellites produce on the order of half a terabyte of data per day. The European Southern Observatory's (ESO's) Sentinel-2 satellite program can generate a pixel density with 10 meters in image resolution, which corresponds to an increased spatial resolution by a factor of about 10. DigitalGlobe's satellites such as WorldView-4 can increase spatial resolution by a factor of roughly 100-times by providing images down to the sub-meter level.

Spatial information is traditionally obtained as raster-based data and is accompanied by vector formats. Examples of raster data include, but are not limited to, weather data, temperature data, soil data, topographic data, and intensities of the red, green, blue, or near infrared band of the electromagnetic spectrum. Raster data can represent a geographical area as a surface divided into a regular grid of cells. Raster models are useful for storing data that varies continuously, as in an aerial photograph, a satellite image, a surface of chemical concentrations, or an elevation surface.

Vector data represents data in a geographical area using points, lines, and polygons. Vector models are useful for storing data that has discrete boundaries, such as country borders, land parcels, and streets/roads.

The source/original data (e.g., individual data layers) for geographical or spatial sets are hosted on myriads of databases, where each database has its own query language and data retrieval tools. Once stored as an overlapped spatial dataset, it can be difficult to search and reintegrate the individual layers using subsequent queries. In many cases, data retrieval results in an extensive time consuming process, or even becomes undiscoverable and therefore requires extensive preparation before a new query can be performed.

Consider, for example, the United States (U.S.) nationwide soil database (SSURGO), which contains designated data extraction boundaries (e.g., polygon-shaped boundaries) containing a rich number of attributes resolved with respect to the soil's depths. The pure file size of the database is approximately 70 gigabytes (GB). In order to access the soil properties, data tables are joined in a Structured Query Language (SQL)-based manner, which can result in an exponential increase of information with respect to number of joined tables. In another example, the U.S. government, as well as crowed-based projects like OpenStreetMap, frequently publish census related information and vector data with respect to human infrastructure.

Traditional data or document discovery relies on keyword query searches. A keyword query search and retrieval process typically involves submitting a short set of keywords, and returning a list of documents or a data set, ranked in order of relevance to the query (often based on popularity and page ranking). As the volume of data contained in data bases increases, however, the scope of the returned search results decreases. Consequently, further analysis must be performed to narrow the search results before the targeted data or documents can be identified.

Question answering (QA) systems have been developed to facilitate data discovery and extraction from data bases containing extensive amounts of data. These QA systems apply advanced data processing techniques including, but not limited to, natural language processing, information retrieval, knowledge representation, automated reasoning, and machine learning technologies, to identify and extract requested data. Unlike the traditional query searches described above, QA systems receive an input question expressed in natural language, seek to understand the question in much greater detail, and return a precise answer to the question. In this manner, subsequent data analysis is greatly reduced. For example, in order to answer an input question phrase: "Which land legally (e.g., census data) and physically (e.g., soil data, weather data, etc.) qualifies for growing a given crop (e.g., soybeans)?" vector data and raster data associated with the input question are fused together, i.e., layered.

Turning now to an overview of aspects of the invention, one or more embodiments of the invention address the above-described shortcomings of the prior art by providing a "space-time density" database system that can utilize a Big Data analytics platform such as, for example, IBM's Physical Analytics Integrated Data Repository and Service (PAIRS) to fuse together vector data and raster data. The database system is configured to index Big Data based on geo-space and time . . . . In this manner, the space-time density system can scalably support cross-layer queries with respect to both raster data and vector data. In one or more non-limiting embodiments of the invention, a geospatial system implements a distributed file system such as the Hadoop Distributed File System (HDFS™) provided by Apache™ Hadoop®. The distributed file system can split data files into large blocks and distribute them across nodes in a cluster, and can transfer packaged code into nodes to process the data in parallel, thereby leveraging data locality where the nodes can manipulate the data at which they can access. Accordingly, the distributed file system allows for submitting an individual raster query to obtain both raster data and an individual vector query to obtain vector data based at least in part on the MapReduce/Apache™ Hadoop®, and Apache Hbase™, and Apache Spark™.

The database system according to one or more non-limiting embodiments of the invention is also capable of fusing raster data and vector data formats. The fusing of raster data and vector data provides a link to perform analytics across multiple datasets of both data format types (i.e., raster formats and vector formats). For example, an initial raster data set can be analyzed and vectorized to generate a "vectorized raster" data result. In other words, a vector data solution can be generated based on an initial raster data set. Similarly, an initial vector data set can be analyzed and rasterized to generate a "rasterized vector" data result. That is, a raster data solution can be generated based on an initial vector data set. Accordingly, a unique data ecosystem is provided that that is capable of extracting geospatial data layered according to both data formats from databases containing vast amounts of data.

Turning now to a more detailed description of aspects of the present invention, FIG. 1 depicts a space-time density database system 100 according to embodiments of the invention. The database system 100 includes a storage sub-system 102, a processing sub-system 104, an application sub-system 106, and a file formatting sub-system 108. The number and arrangement of the sub-systems 102, 104, 106 and 108 are illustrated as examples and are in no way meant to limit the database system 100 to any particular arrangement and/or number of sub-systems.

The storage sub-system 102 includes a distributed file system 110 and a distributed database 112. The storage sub-system 102 can operate in conjunction with the file formatting sub-system 108 to load or store data according to various file formats. In one or more embodiments of the invention, an ASCII file generator generates an ASCII base file. Instead of directly employing plain ASCII text files, data uploading is implemented by appending the plain ASCII text files to existing files in the HDFS™ 110. The ASCII base file can be converted into a column-based data file via a column-organized Apache Parquet™ file format generator 111, and data frames can be loaded from the Apache Parquet™ files according to the HDFS™ framework. In addition, Apache Parquet™ files can be directly accessed using SQL queries employed by the PySpark™, which allows for performing additional data analytics on the vector data.

The distributed file system 110 includes, for example, a clustered file system which can be shared by being simultaneously mounted on multiple servers. In one or more embodiments of the invention, the distributed file system 110 is implemented as a HDFS™ according to the Apache™ Hadoop® architectural framework.

When implementing the distributed file system 110 according to HDFS™, for example, corresponding HDFS files are created following the file name convention "<ma>_<n>-<Z>-<t>.pvd" where the extension "pvd" indicates the newly defined "PAIRS Vector Data" file type: "PVD" for short thereafter. The parameter "<ma>" represents a main attribute into which we classify all vector data, e.g. streets, houses, tweets, etc. The parameter "<n>" represents a given "virtual" resolution layer. The parameter "<Z>" serves as an index for a geo-spatial area. The parameter "<t>" represents a gridded timestamp (t') in terms of a Unix epoch time, e.g., the seconds elapsed since Jan. 1, 1970, zero am (0 hours, 0 minutes, 0 seconds). Data with exact timestamps t, for example, can be stored as a dictionary parameter (cf Eq. 1) such that t is within the time interval

[t', t'+Δt'). The time interval length Δt' is a parameter to be fixed depending on the type of data.

In one or more embodiments of the invention, the parameter "<Z>" can be substituted by an (unsigned) integer representation of a geo-spatial index (Zn) at a given resolution layer <n>. The geo-spatial index (Zn) at resolution layer <n> defines a geo-spatial square in latitude-longitude space (x, y), i.e., xn≤x<xn+$d_n$, and yn≤y<yn+$d_n$ for a given resolution ($d_n$), e.g. "half a degree longitude/latitude". To phrase it differently: Each Zn can be uniquely associated with two geo-spatial coordinates (xn, yn), and the index n specifies a corresponding, unique resolution $d_n$. Hence, a fused raster-vector correlation can be established by storing vector data in the HDFS file specified above (i.e., <ma>_<n>-<Z>-<t>.pvd).

According to one or more embodiments of the invention, each line of the ASCII-based PVD text file represents vector data as python objects. Thus, the ASCII-based PVD text file follows the following data structure:

$$R=\{"i":id, "g":P, "a":A, "q":Q\} \quad [\text{Eq. 1}]$$

The parameter "R" references a Python dictionary parameter. Single characters are used to reduce storage. The parameter "i" represents a vector data identifier. The parameter "g" represents geo-spatial vector data. The parameter "a" represents optional vector data attributes. The parameter "q" represents an optional tree data structure parameter such as, for example, a quadtree structure data parameter. The parameter "id" is a unique object identifier which identifies duplicates of merging multiple files.

The PVD text file provides different options for storing vector data in the distributed file system 110 based on the definition of Zn. According to a first option, all boundary extraction shapes (e.g., polygon) overlapping with the "virtual" region/square associated with Zn and whose assigned timestamp falls within the time interval [t, t+Δt') of the gridded timestamp t' represented by the PVD file name parameter <t> are stored in the PVD text file. This procedure duplicates boundary extraction shapes. According to a second option, data is cropped to the boundary of the virtual region/square. In both cases the unique id from Eq. 1 is required to invert this operation.

The first option is useful for polygons-shaped extraction boundaries whose typical area (a) to bounding-box-area ($a_B$) ratio is close to one, i.e., $a/a_B \approx 1$. Moreover, the variance of the area (δa) should be mild, or at least smaller, compared to the average of the polygon's area (a'), i.e. δa/a'<1. This typically holds true for organized fixture-shapes such as, for example, houses and buildings.

For example, assuming an organized fixture area, such as a house area (a') measured in units squared (e.g., ft²) being built at a rate (f) and given a maximum file size restriction in terms of number of lines ($N_S$), the resolution layer "<n>" can be determined according to the following expression:

$$d_n^2 = a' \cdot N_S/f \cdot \Delta t' \quad [\text{Eq. 2}]$$

The second option can be used when parameters for the first option are unknown. An example can include a road winding through a country side. In the worst case, it interconnects all Zn at a given resolution layer <n> such that the duplication becomes maximal. Employing option 2 described above cuts all vector data such that no duplicates get created. However, the original line/polygon when querying an area that contains multiple Zn must be reconstructed. To this end the "id" parameter can identify duplicate data elements.

In one or more embodiments of the invention, density data can be utilized to determine an average or estimated number of objects per unit area. The density data can be determined according to the following equation:

$$\rho = N_S/d_n^2 f \cdot \Delta t' \quad [\text{Eq. 3}]$$

In terms of data representing houses or buildings, the polygon's area (a') can be identified as an inverse density, i.e. one house-per house area, for example, when assuming houses typically do not overlap in space.

Establishing a link between the raster data and the vector data provides a geo-spatial partitioning/indexing of the vector data. In this manner, the amount of data to be analyzed is reduced while also providing a geo-spatial area of interest within a given time interval. In essence, the file name convention defines a space-time volume which can be expressed as:

$$d_n^2 \Delta t' \quad [\text{Eq. 4}]$$

Under the constraint of an appropriate PVD file size (proportional to NS) which establishes optimal system performance as discussed below, t' and do can be varied such that their product stays constant. When given ρ and f for example, a fixed space-time density corresponding to the vector data can be generated, which in turn can be used to determine the maximum file size restriction ($N_S$) based on the expression:

$$N_S = \rho f d_n^2 \Delta t' \sim d_n^2 \Delta t' = \text{constant value}, \quad [\text{Eq. 5}]$$

where ρf is a given or fixed space-time density corresponding to the vector data.

Given the fixed product ρf (referred to as "space-time density" here) is known, and depending on the query expected for the vector data, Δt' and $d_n$ can be varied to adjust the partition of the vector data across the PVD files. If ρ and f are separately known, for the case where fΔt' is much larger than $\rho d_n^2$ (given the constraint Eq. 5), the PVD file would dominantly contain time series of data spatially close to each other. Alternatively, if fΔt' is much smaller than $\rho d_n^2$ spatial snapshots of data are accumulated by the corresponding PVD file. However, the space-time density itself can be used to relate $d_n$ and Δt' by virtue of Eq. 5. This provides useful, e.g. for vector data associated with moving objects such as, for example, cars. It should be appreciated that the system 100 can be operated to provide compromises between both query types discussed above, i.e. when fΔt'~$\rho d_n^2$.

Figure 2:
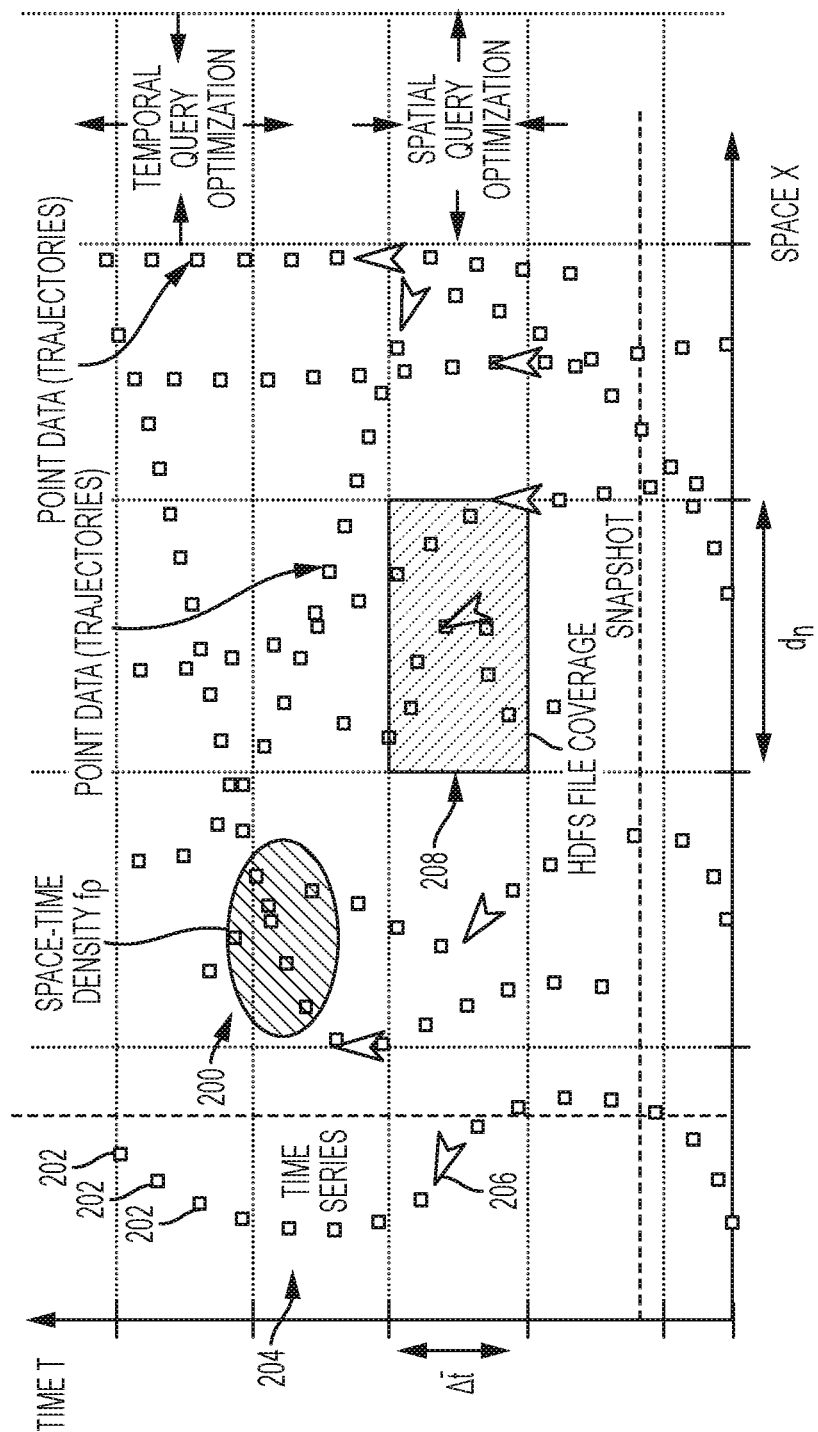
FIG. 2 depicts a schematic diagram illustrating a correlation between space-time density ($\rho f$) and space-time "volume" ($d_n \Delta t'$) for spatial vs. temporal queries according to embodiments of the invention.

FIG. 2 is a schematic diagram illustrating how the space-time density ρf) 200 can establish a link (i.e., correlation) to a one-dimensional space-time volume ($d_n$Δt') for spatial vs. temporal queries. The path of individual data points 202 can represent trajectories 204 of moving vector objects 206, e.g. cars. A data file coverage area 208 determines whether a given ρf 200 is covered by a given HDFS data file. It should be appreciated, however, that the example illustrated in FIG. 2 is not limited to point data.

Returning to FIG. 1, the distributed database 112 can include several independent data storage sites that share no physical components. Data can be extracted from different storage sites and combined to provide a result. The storage sites can be employed in multiple computers, data servers, etc., which are located in the same physical location, or can be dispersed over a network of interconnected computers. Accordingly, the network of individual data storage sites can define the distributed data base 110. Unlike parallel systems, in which the processors are tightly coupled and constitute a single database system, a distributed database 112 can be implemented as loosely coupled sites that share no physical components. In this manner, large collections of data (e.g. in a database) can be distributed across multiple physical locations or storage sites.

In one or more embodiments of the invention, the distributed database 112 is implemented as an Apache Hbase™ 112, and runs in conjunction with the distributed file system 110 when it is implemented as a HDFS™. The Hbase™ 112 is a column-oriented key-value distributed database. Tables in the Hbase™ 112 can be accessed via a web interface 115 and/or various APIs 117 (e.g., PAIRS API), included in the application sub-system 106. The Hbase™ 112 is well-suited for faster read and write operations on large datasets with high throughput and low input/output latency. In this manner, the Hbase™ 112 can provide a fault-tolerant way of storing large quantities of sparse data. Sparse data is referred to as small amounts of information caught within a large collection of empty or unimportant data, sometimes referred to as "noise." Examples of sparse data include identifying the 50 largest items in a group of 2 billion records, or determining the non-zero items representing less than 0.1% of an immense data collection). In one or more embodiments of the invention, the Hbase™ 112 includes a Structured Query Language (SQL) layer with a SQL query engine, as well as database connection API such as a Java™ Database Connectivity (JDBC) driver that can be integrated with various analytics and business intelligence applications.

The processing sub-system 104 includes a parallel vector data (PVD) processor 114, a MapReduce processor 116, and a data fusing processor 118. Any one of the PVD processor 114, MapReduce processor 116, and data fusing processor 118 can be constructed as an electronic hardware controller that includes memory and a processor configured to execute algorithms and computer-readable program instructions stored in the memory.

The PVD processor 114 can be constructed according to a distributed computing and cluster-computing framework that includes an interface for programming entire clusters (e.g., computer clusters) with implicit data parallelism and fault-tolerance. In one or more embodiments of the invention, the PVD processor 112 is implemented according to the Apache Spark™/PySpark™ framework. Accordingly, the PVD processor 112 can provide an application programming interface centered on a data structure referred to as a resilient distributed dataset (RDD) 115. The RDD 115 is a read-only multiset of data items distributed over a cluster of machines and can be maintained in a fault-tolerant way. Being a scalable platform, the PVD processor 114 can one or more load RDDs 115 into the memory (e.g., distributed memory) of a compute cluster. When the PVD processor 114 is implemented according to the Apache Spark™ framework, a sequence of transformations ({f1, f2, ... fn}) which act on a given RDD can be defined as:

$$RDD \to f_1(RDD) \to f2(f1(RDD))$$ [Eq. 6]

One or more RDDs 115 can be loaded from various sources. One option is to incorporate an ASCII text file that is distributed among the cluster nodes using the distributed file system 110 (e.g., HDFS). Accordingly, the PVD processor 114 can individually act on each line of the text and apply the sequence {fn}. A line of the text can include e.g. a JSON representation of the data structure defined in Eq. 1, which defines a boundary shape such as, for example, a polygon with corresponding attributes.

When implemented according to the Apache Spark™ framework, the PVD processor 114 also includes a scripting language API such as, for example, PySpark™ The PySpark™ API allows access to various geo-spatial packages, which allow operating on data tables (i.e., dataframes) through SQL operations. The ability to utilize SQL operations also allows for direct access to column-oriented database management system (DBMS) such as, for example, the Apache Parquet™ file format generator 111.

The MapReduce processor 116 is configured to process and generate Big Data sets with a parallel, distributed algorithm on a cluster. The MapReduce processor 116 is configured to perform a Map process and a Reduce process. The Map process (e.g., algorithm) performs filtering and sorting such as, for example, sorting students by first name into queues, one queue for each name. The Reduce process performs a summary operation such as, for example, counting the number of students in each queue, yielding name frequencies. Accordingly, the MapReduce processor 116 can process data by performing various operations including, but not limited to, marshalling the distributed servers, running the various tasks in parallel, managing all communications and data transfers between the various parts of the system, and providing for redundancy and fault tolerance.

The data fusing processor 118 is configured to obtain filtered raster data, and fuse together (e.g., layer) the filtered raster data with a collection of vector data. In one or more embodiments of the invention, the data fusing processor 118 is implemented according to PAIRS provided by IBM®. Because the raster data is fused together with the vector data, the data fusing processor 118 can receive a vector query, rasterize the fused data, and generate a raster data result. The data fusing processor 118 can store data as plain ASCII in HDFS (if they are vectorized), but in standard operation mode, the query result is forwarded to 115 or 117 as e.g. GeoJSON (vector data) and GeoTiff (raster data) for further consumption.

The data fusing processor 118 can also receive a raster query, vectorize the fused data, and generate a vector data result. Further details regarding the capability of obtaining "vectorized raster data" from geo-referenced raster data and "rasterized vector data" from geo-referenced vector data is described below.

In one or more embodiments of the invention, the data fusing processor 118 links tempo-spatial raster data to vector format objects. The vector data processed by the data fusing processor includes: (1) a point, (2) a line, and (3) a boundary shape. The point includes a single geo-spatial coordinate (x, y), e.g. geo-tagged tweet, location of a store, etc. The line includes a sequence of geo-spatial coordinates $\{(x_n, y_n)\}_{n=1 \ldots N}$, where (x1, y1) is not equal to (xN, yN), which represents, for example, a street, a river, a moving trajectory, etc. The boundary shape such as a polygon, for example, is similar to the line but includes matching last and first coordinate that indicate, for example, a building, a lake, etc. Moreover, there can be sequences $\{(x'n, y'n)\}_{n=1 \ldots M}$, with (x'1, y'1)=(x'M, y'M), corresponding to interior coordinates that represent a hole. The process of linking the tempo-spatial raster data to vector format objects includes fusing (i.e., layering) filtered raster data together with vector data.

Figure 3:
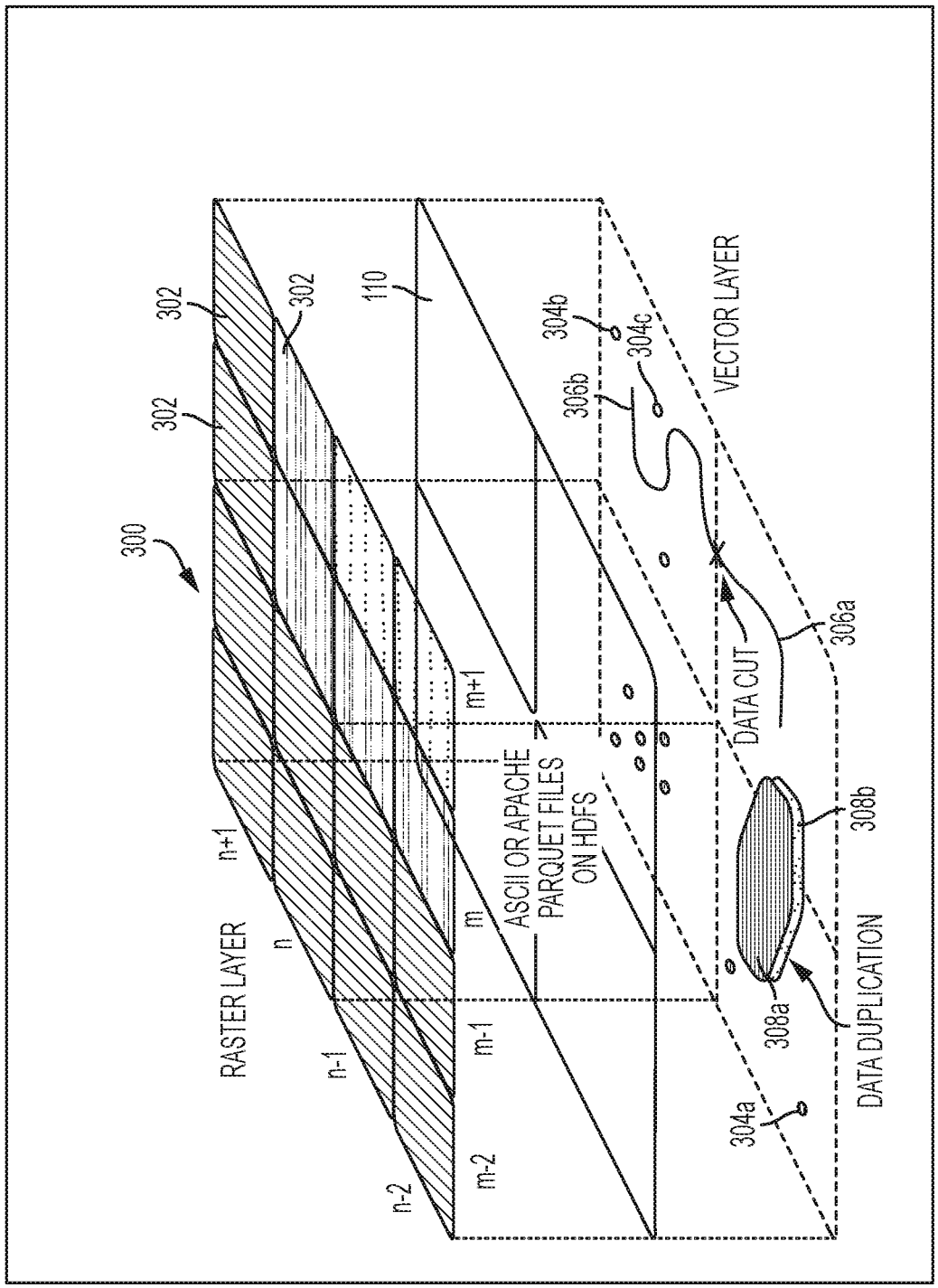
FIG. 3 is a diagram illustrating the process of fusing filtered raster data together with vector data according to embodiments of the invention.

Turning to FIG. 3, the diagram illustrates the process of fusing (i.e., layering) filtered raster data together with vector data according to one or more non-limiting embodiments of the invention. The data fusing processor 118 generates a raster grid 300 that corresponds to the virtual grid 110 which is defined by the PVD file (e.g., <ma>_<n>-<Z>-<t>.pvd. The raster grid 300 includes a plurality of raster cells (Z1) 302. Each raster cell 302 can be identified by a corresponding set of coordinates (e.g., latitude coordinate, longitude coordinate). Raster cells containing vector objects (e.g., points, lines, boundary shapes, etc.) are identified, and the contained vector objects are assigned the coordinates of the given raster cell. Accordingly, the vector data (i.e., unrasterized data) is correlated to spatial raster data.

In one or more embodiments of the invention, vector data is assigned grid coordinate information based on alignment of one or more raster cells 302 with respect to a vector object, or portion of the vector object. For example, an initial vector data set is received, which includes at least one vector object such as, for example, a point, a line and/or a boundary shape (e.g., polygon). The raster grid 300 is overlaid on the vector data set to define a plurality of cells 302. The raster grid 300 includes a series of latitude coordinates (m−2, m−1, m, m+1, etc.) assigned to a horizontal axis of the grid and a series of longitude coordinates (n−2, n−1, n, n+1, etc.) assigned to a vertical axis of the grid. A set of latitude and longitude coordinates (e.g., m+1; n−2) defines a cell among the plurality of cells. In this manner, a given cell (e.g., m+1; n−2) can be identified which contains a vector object or least a portion of a vector data (e.g., 306a). The vector object or portion thereof is then assigned the set of latitude and longitude coordinates of the given cell.

Each PVD file is assigned to a given raster cell 302 at a set resolution level (e.g., level 1). Accordingly, points 304a, 304b, 304c . . . 304n are automatically linked to the grid 300. Lines 306 and boundary shapes 308 (e.g., polygons) that share multiple raster cells 302 are either split into multiple vector objects (see line segments 306a and 306b) or are duplicated (see duplicate boundary shapes 308a and 308b) within the file. Duplicated elements (e.g., 308a and 308b) can be identified using the "id" parameter included in the ASCII-based PVD text file (i.e., R={"i": id, "g": P, "a": A, "q": Q}) described above.

Figure 4A:
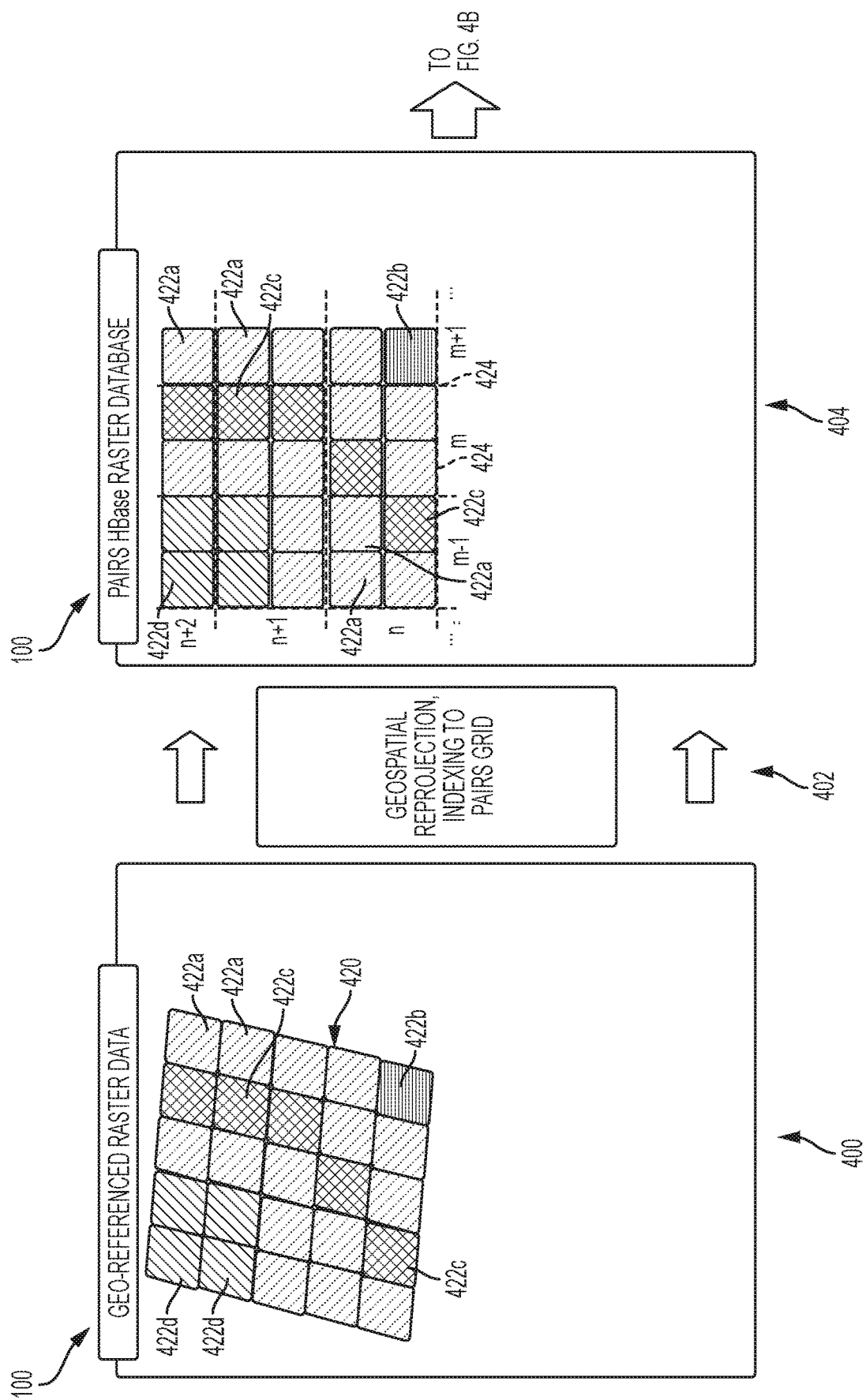
FIG. 4A depicts a process flow diagram illustrating operations performed by the database system to obtain "vectorized raster data" from geo-referenced raster data according to embodiments of the invention.
Figure 4B:
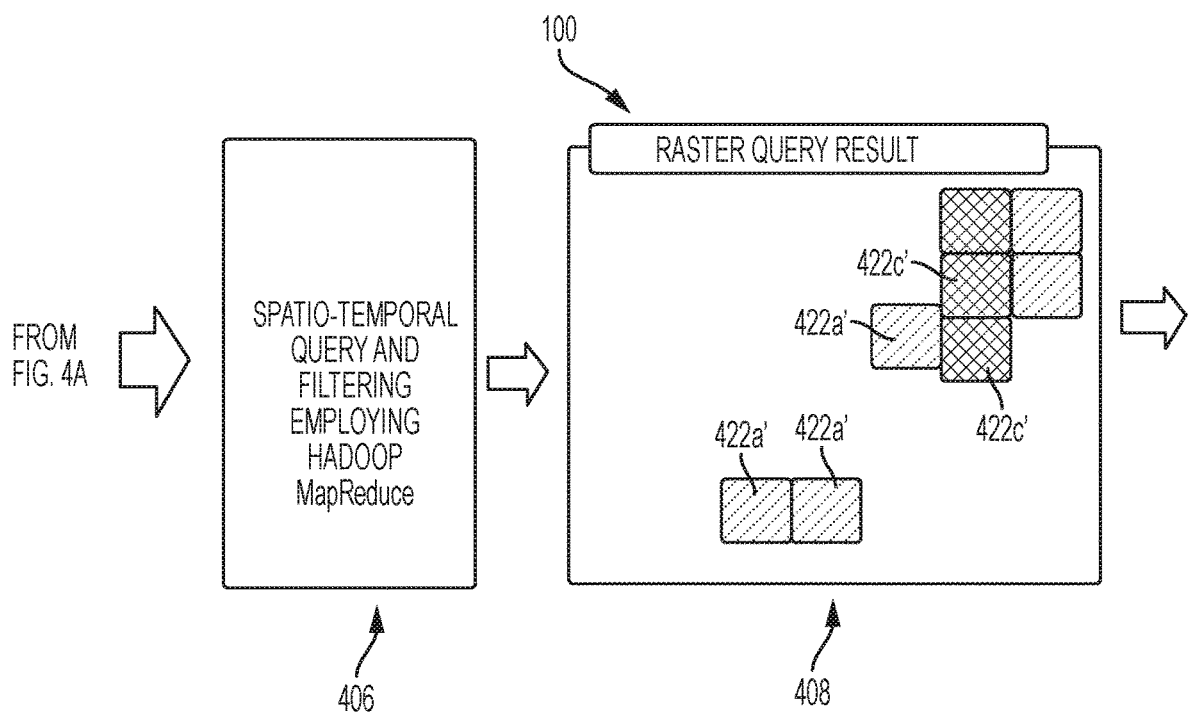
FIG. 4B is a continuation of FIG. 4A.
Figure 4B:
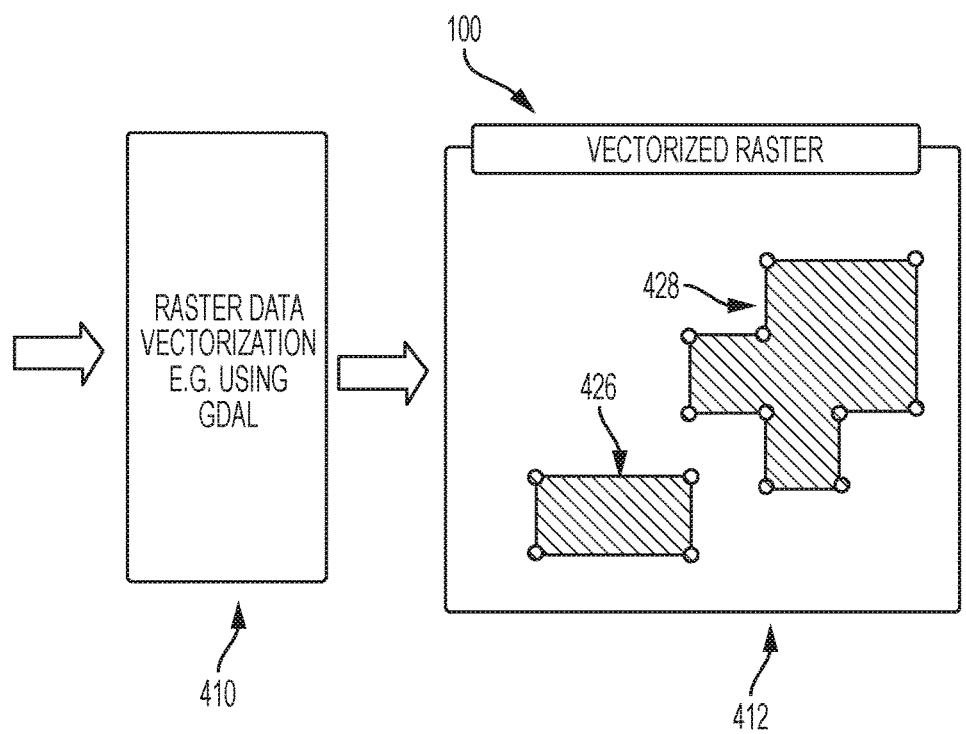

The process flow diagram illustrated in FIGS. 4A and 4B illustrate the capability of the space-time density database system 100 to obtain "vectorized raster data" from georeferenced raster data. Turning to operation 400, the database system 100 receives a query for vectorized data results based on raster data. The vectorized data obtained from vectorizing raster data is referred to herein as "vectorized raster data." In response to receiving the vectorized data query, the database system 100 obtains geo-referenced raster data from a raster data source. The raster data source includes, for example, satellite imagery, 2-dimensional (2-D) weather mapping data, etc. The raster data 420 includes a plurality of individual pixels 422a, 422b, 422c, 422d, 422n. The pixels can represent various elements or objects included in the raster data 420. For example, a first pixel 422b can represent a house. A second group of pixels 422c can represent a river. A third group of pixels 422d can represent a forest or wooded area. The raster data 420 can be given in various geo-spatial projections including, but not limited to, UTM (Universal Transverse Mercator), BNG (British National Grid), and USNG (U.S. National Grid). The raster data 420 can also include timestamp information such as, for example, a time and/or date at which the image was captured by the raster data source.

Turning to operation 402, the database system 100 performs geospatial grid reprojection which overlays a grid system 424 on the pixels 422a-422n as shown in operation 404. Accordingly, the pixels 422a-422n are assigned a value based on their alignment with the grid system 424. In one or more embodiments of the invention, the grid system 424 is partitioned according to a tree data structure such as a quadtree data structure, for example, and is assigned latitude coordinates m−1, m, m+1, m+2, etc., and latitude coordinates n, n+1, n+2, etc. In this manner, the pixels 422a-422n are indexed according to the coordinates of the grid system 424.

Turning to operation 406, spatial-temporal information of the raster data 420 is used to filter the of the raster data 420 according to the query. Accordingly, one or more filtered pixels 422a' and 422c' are identified and extracted from the initial raster data set 420 to generate a raster data query result (i.e., filtered raster data) as illustrated in operation 408. At operation 410, the filtered pixels 422a' and 422c' are vectorized to generate vector data. The vectorized raster data 426 and 428 is provided which represents the raster data query result, i.e., the filtered pixels 422a' and 422c' as shown in operation 412. For example, vector shapes 426 and 428 are indicative of a raster data query result can be generated based on the filtered raster pixels 422a' and 422c' extracted from the initial raster data set 420. In this manner, the database system 100 generates "vectorized raster data" 426 and 428 from an initial geo-referenced raster data set 420.

Figure 5A:
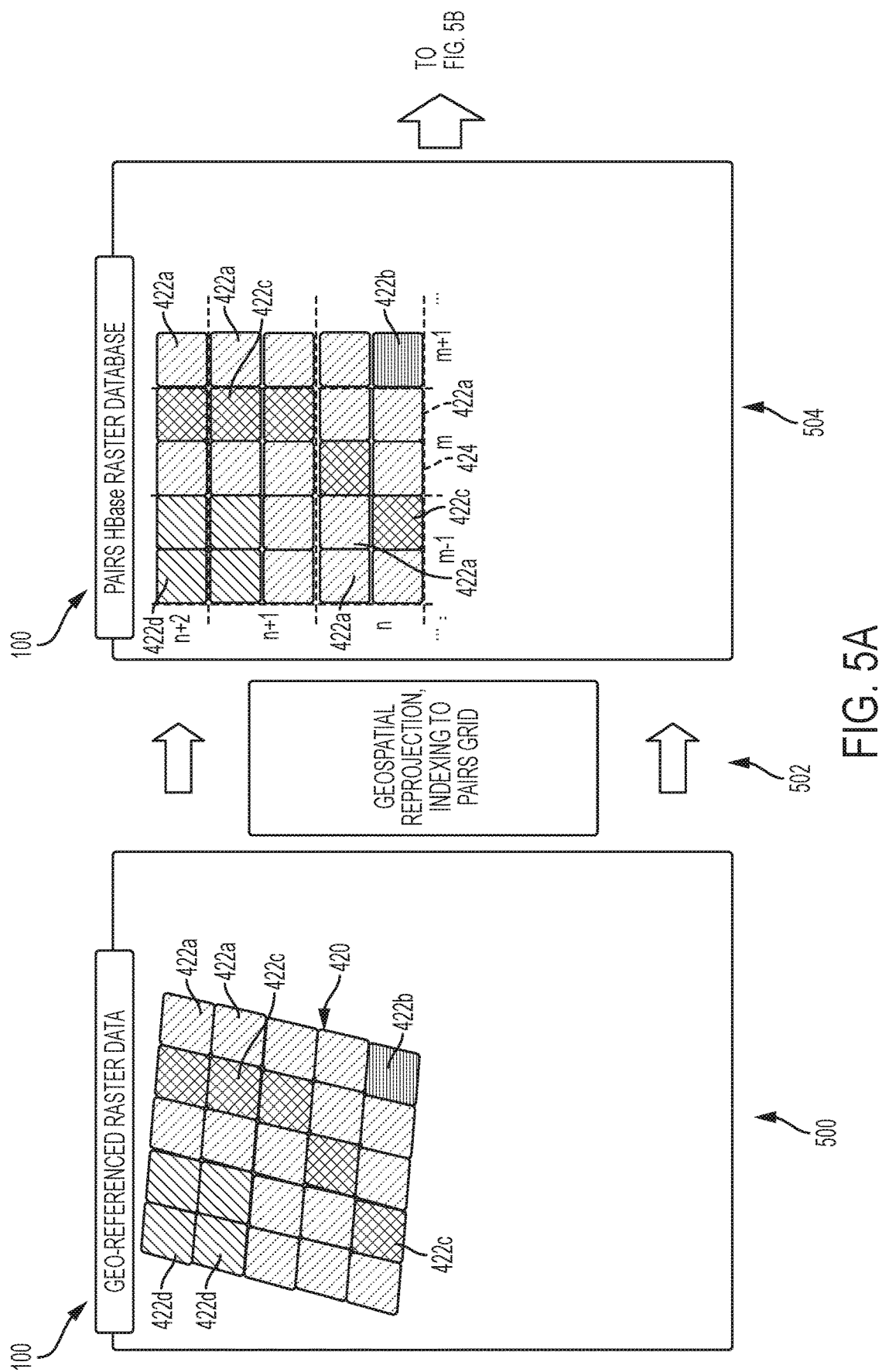
FIG. 5A depicts a process flow diagram illustrating operations performed by the database system to obtain "vectorized raster data" from geo-referenced raster data based on image recognition analysis according to embodiments of the invention.
Figure 5B:
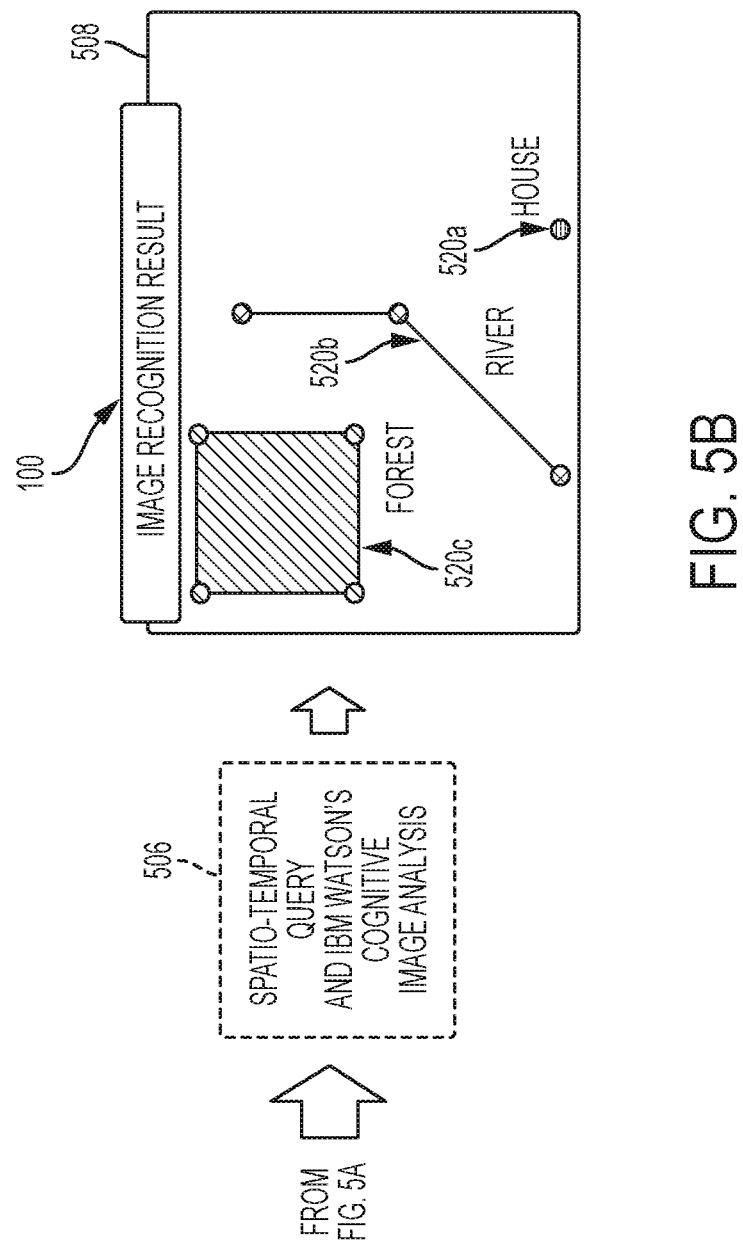
FIG. 5B is a continuation of FIG. 5A.

The process flow diagram illustrated in FIGS. 5A and 5B illustrate the capability of the space-time density database system 100 to obtain "vectorized raster data" from georeferenced raster data based on image recognition analysis. Operations 500, 502 and 504 are similar to operations described above with respect to FIGS. 4A-4B, and therefore their descriptions will not be repeated. Turning to operation 506, a spatial-temporal query is received, and the database system 100 performs various image recognition analytical processes on the geospatial grid reprojection of the pixels 422a, 422b, 422c and 422 generated in operation 504. The database system 100 can implement various deep learning algorithms and image recognition algorithms to identify scenes, objects, and elements from the initial raster data set 420. For instance, the query can be used to identify one or more targeted objects (e.g., a house, river, forest, etc.) from the raster data set. Based on the query, the database system 100 applies the image recognition process to the raster data, identifies the objects corresponding to the query, and generates the image recognition result as "vectorized raster data" at operation 508. The vectorized raster data represent one or more recognized objects 520a, 520b, 520c that satisfy the input query. In this manner, the database system 100 generates "vectorized raster data" 520 from geo-referenced raster data 420 based on image recognition analysis.

Figure 6A:
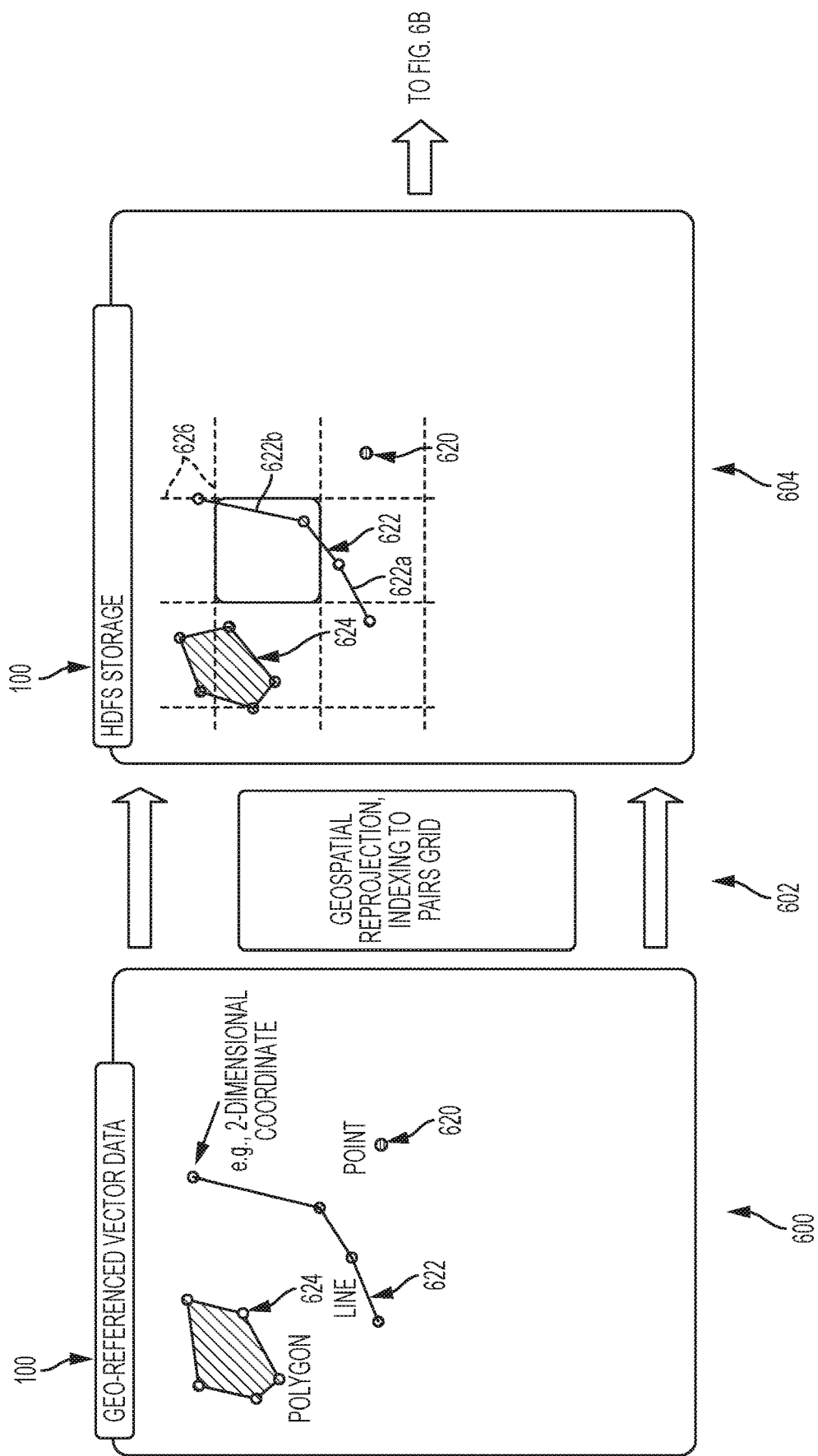
FIG. 6A depicts a process flow diagram illustrating operations performed by the database system to obtain "rasterized vector data" from geo-referenced vector data according to embodiments of the invention.
Figure 6B:
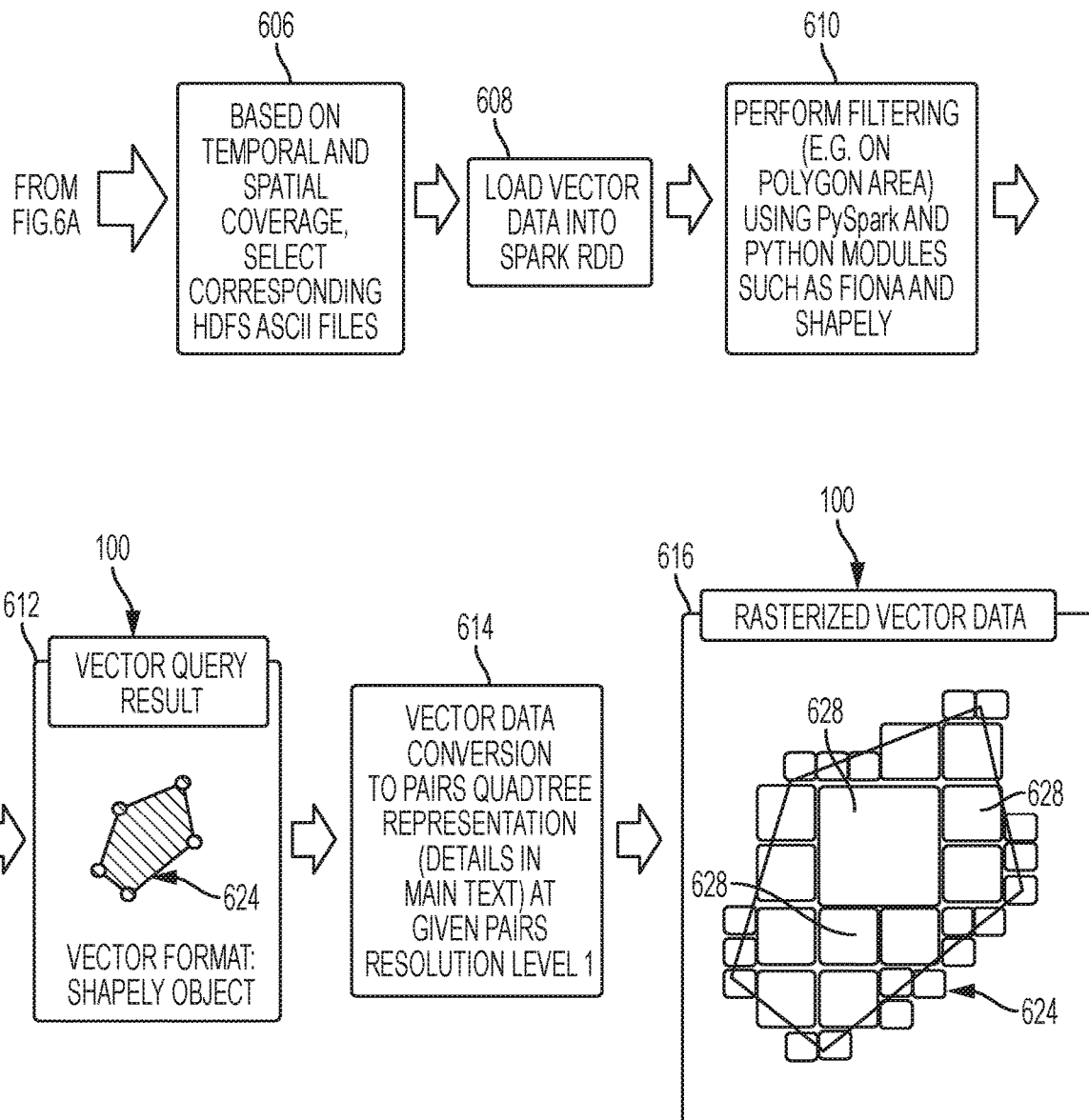
FIG. 6B is a continuation of FIG. 6A.

The process flow diagram illustrated in FIGS. 6A and 6B illustrate the capability of the database system 100 to obtain "rasterized vector data" from geo-referenced vector data. At operation 600, the database system 100 receives a query for rasterized data results based on from an initial vector data set. The rasterized data obtained from rasterizing the vector data is referred to herein as "rasterized vector data." In response to receiving the rasterized data query, the database system 100 obtains geo-referenced vector data from a vector data source such as, for example, OpenStreetMap. The vector data source includes, for example, points 620, lines 622, and/or boundary shapes 624 (e.g., polygons). A vector point 620 can represent a house, for example, a vector line can 622 represent a river, for example, and a polygon 624 can represent a residential neighborhood, for example. The vector data 620, 622 and 624 can be given in various geo-spatial projections including, but not limited to, UTM, BNG, and USNG. The vector data 620, 622 and 624 can also include timestamp information such as, for example, the date at which the neighborhood boundary was defined or the date a street was constructed.

Turning to operation 602, the database system 100 performs geospatial grid reprojection which overlays a grid system 626 on the vector data 620, 622 and 624 as shown in operation 604. Accordingly, the vector data 620, 622 and 624 are assigned a value based on their alignment with the grid system 424. In one or more embodiments of the invention, the grid system 626 is partitioned according to a tree data structure such as a quadtree data structure, for example, and is assigned latitude coordinates m−1, m, m+1, m+2, etc., and latitude coordinates n, n+1, n+2, etc. In this manner, the vector data 620, 622 and 624 are indexed according to the coordinates of the grid system 626. The indexed vector data vector data 620, 622 and 624 are then stored in a distributed file system 110 (e.g., HDFS™) as single lines of the PVD file. In one or more embodiments of the invention, vector objects (e.g., line 622) are split into individual sub-elements 622*a* and 622*b* (e.g., line segments) when crossing multiple grid cells 626.

Turning to operation 606, one or more PVD files are selected that correspond to the temporal and spatial coverage of the input query. At operation 608, the index data is extracted from the PVD files, and the PVD processor 112 provides an application programming interface centered corresponding to a resilient distributed dataset (RDD) 115. At operation 610, the vector data 620, 622 and 624 corresponding to the selected ASCII files are filtered according to the input query, and a filtered vector query result is generated at operation 612. In the example illustrated in FIGS. 6A-6B, the filtered vector query results provide a boundary shape 624 (e.g., polygon). At operation 614, the filtered vector query results are converted into a tree data structure (e.g., quadtree) representation at a set resolution level. Accordingly, the rasterized vector data is generated at operation 616, which includes rasterized data pixels 628 bounded by the filtered vector query result, i.e., the filter polygon 624.

It is understood implementation of the teachings recited herein are not limited to any particular computing environment. Rather, embodiments of the present invention are capable of being implemented in conjunction with any other type of computing environment now known or later developed.

One or more embodiments of the invention can be implemented in a cloud computing system, for example. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
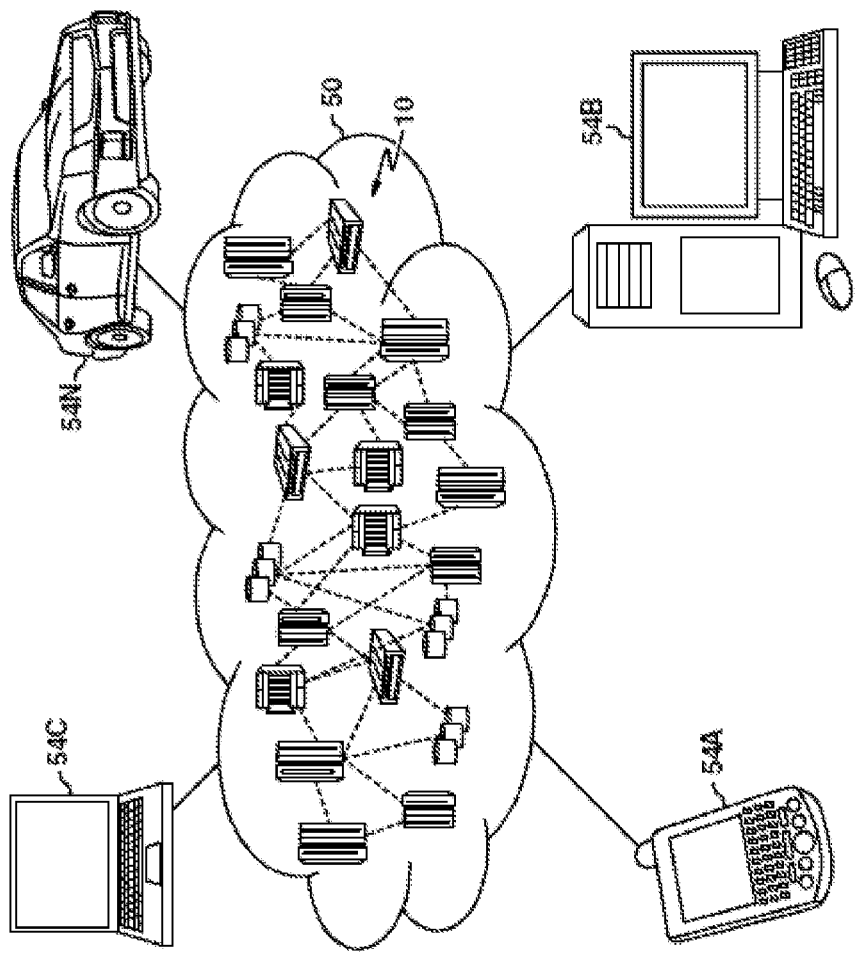
FIG. 7 depicts a cloud computing environment according to embodiments of the invention.

With respect to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
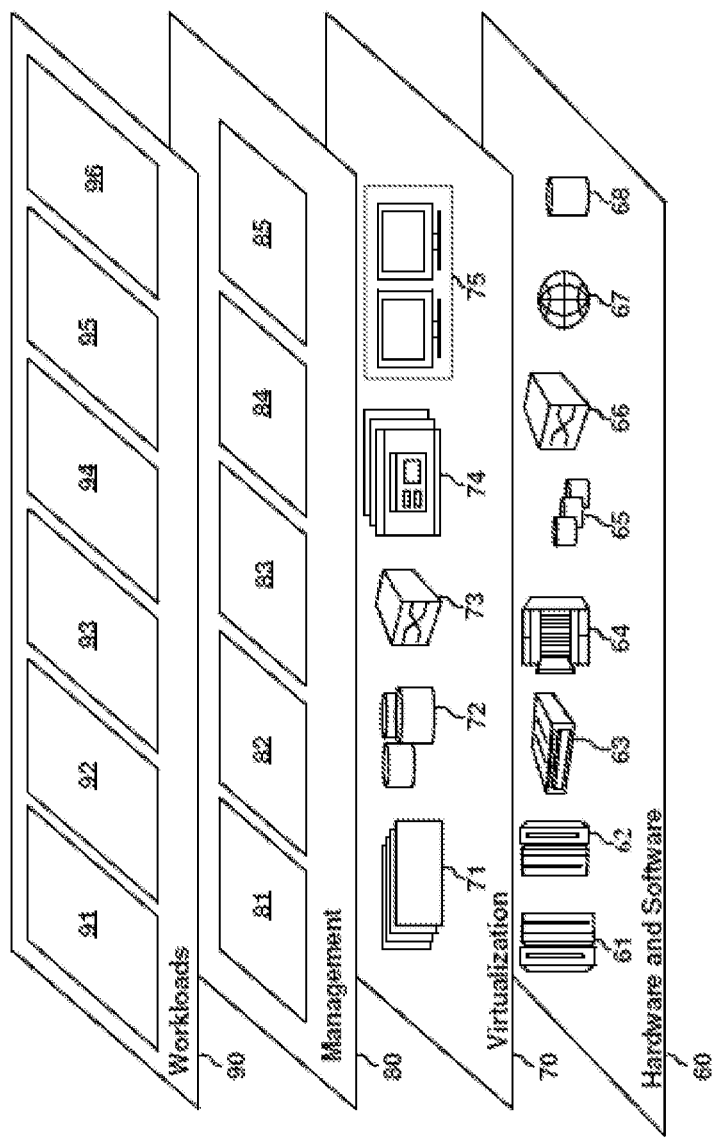
FIG. 8 depicts abstraction model layers according to embodiments of the invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and input data analysis 96.

Figure 9:
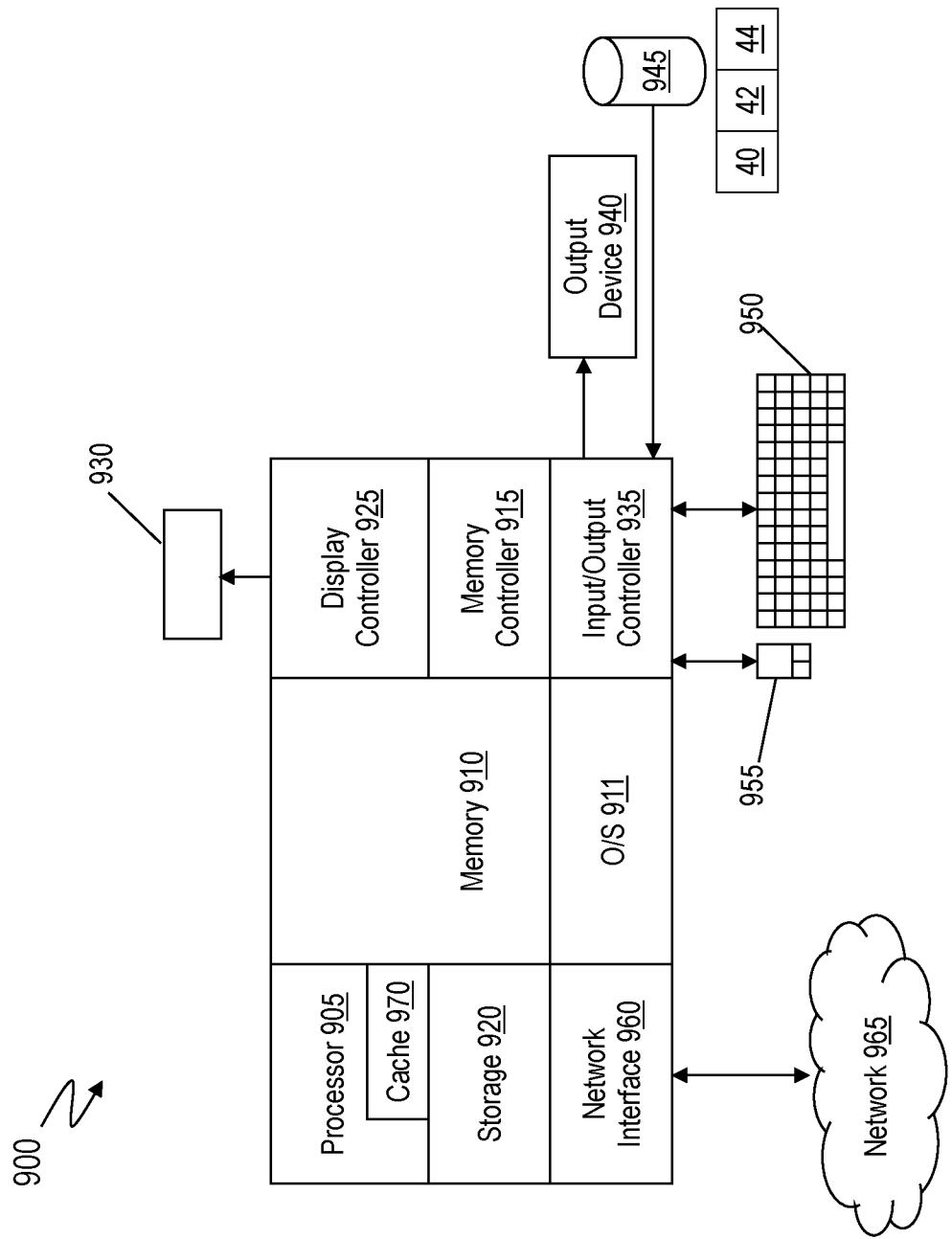
FIG. 9 depicts a communication apparatus according to embodiments of the present invention.

With reference to FIG. 9, a computing system 900 capable of capable of fusing together raster data and vector data formats is illustrated according to one or more embodiments of the invention. The computing system 900 can include a computer, such as a server, a laptop computer, a tablet computer, a phone, and the like.

The computing system 900 includes, among other components, a processor 905, memory 910 coupled to a memory controller 915, and one or more input devices 945 and/or output devices 940, such as peripheral or control devices, which are communicatively coupled via a local I/O controller 935. These devices 940 and 945 may include, for example, battery sensors, position sensors (altimeter 40, accelerometer 42, GPS 44), indicator/identification lights and the like. Input devices such as a conventional keyboard 950 and mouse 955 may be coupled to the I/O controller 935. The I/O controller 935 may be, for example, one or more buses or other wired or wireless connections, as are known in the art. The I/O controller 935 may have additional elements, which are omitted for simplicity, such as controllers, buffers (caches), drivers, repeaters, and receivers, to enable communications.

The I/O devices 940, 945 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 905 is a hardware device for executing hardware instructions or software, particularly those stored in memory 910. The processor 905 may be a custom made or commercially available processor, a central processing unit (CPU), an auxiliary processor among several processors associated with the computing system 900, a semiconductor based microprocessor (in the form of a microchip or chip set), a macroprocessor, or other device for executing instructions. The processor 905 includes a cache 970, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 970 may be organized as a hierarchy of more cache levels (L1, L9, and so on.).

The memory 910 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 910 may incorporate electronic, magnetic, optical, or other types of storage media. Note that the memory 910 may have a distributed architecture, where various components are situated remote from one another but may be accessed by the processor 905.

The instructions in memory 910 may include one or more separate programs, each of which comprises an ordered listing of executable instructions for implementing logical functions. In the example of FIG. 9, the instructions in the memory 910 include a suitable operating system (O/S) 911. The O/S 911 essentially may control the execution of other computer programs and provides scheduling, input-output control, file and data management, memory management, and communication control and related services.

Additional data, including, for example, instructions for the processor 905 or other retrievable information, may be stored in storage 990, which may be a storage device such as a hard disk drive or solid state drive. The stored instructions in memory 910 or in storage 990 may include those enabling the processor to execute one or more aspects of the systems and methods described herein.

The computing system 900 may further include a display controller 995 coupled to a user interface or display 930. In some embodiments, the display 930 may be an LCD screen. In other embodiments, the display 930 may include a plurality of LED status lights. In some embodiments, the computing system 900 may further include a network interface 960 for coupling to a network 965. The network 965 may be an IP-based network for communication between the computing system 900 and an external server, client and the like via a broadband connection. In an embodiment, the network 965 may be a satellite network. The network 965 transmits and receives data between the computing system 900 and external systems. In some embodiments, the network 965 may be a managed IP network administered by a service provider. The network 965 may be implemented in a wireless fashion, for example, using wireless protocols and technologies, such as WiFi, WiMax, satellite, or any other. The network 965 may also be a packet-switched network such as a local area network, wide area network, metropolitan area network, the Internet, or other similar type of network environment. The network 965 may be a fixed wireless network, a wireless local area network (LAN), a wireless wide area network (WAN) a personal area network (PAN), a virtual private network (VPN), intranet or other suitable network system and may include equipment for receiving and transmitting signals.

Various embodiments of the invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "electrical communication" means any means of transferring an electrical signal from a first node to a second node including, but not limited to, wired connections and/or wireless connections.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, techniques related to database storage and processing may or may not be described in detail herein. For example, specific image recognition algorithms and/or learning algorithms can be implemented by the geo-spatial database system to perform various data queries and analytics. Although specific analytic algorithms operations used in implementing one or more embodiments of the present invention can be individually known, the described combination of operations and/or resulting structures of the present invention are unique. Thus, the unique combination of the operations described in connection with geo-spatial data analytics according to the present invention can implement a variety of individually known data processing and analytic operations, some of which are described in the immediately following paragraphs, while still providing a unique and novel system.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of operating a database system, the computer-implemented method comprising:
   receiving first formatted data at a processing sub-system including an electronic hardware controller;
   assigning, using an electronic file formatting sub-system, coordinate values corresponding to a second data format to the first formatted data;
   generating, using the file formatting sub-system, a dual-format data file that correlates the first formatted data with the coordinate values corresponding to a second data format; and
   storing, in a data storage unit, the dual-format data file;
   obtaining, via the processing sub-system; a given dual format data file in response to a raster data query;
   performing, via the processing sub-system, a geospatial grid reprojection that overlays a grid system on the plurality of raster pixels and assigns geospatial coordinate values to the plurality of raster pixels;
   identifying, via the processing sub-system, pixels corresponding to at least one raster object based on the geospatial coordinate values from pixels excluding at least one raster object and extracting the identified pixels corresponding to the at least one raster object from remaining pixels;
   filtering, via the processing sub-system, the identified raster pixels corresponding to the at least one raster object to define at least one filtered pixel to determine shapes among a plurality of different types of shapes, the shapes indicative of a raster data query result to the raster data query; and
   performing, via the processing sub-system, an image recognition analysis on the geospatial grid reprojection of the pixels that define the shapes to determine vectorized raster data as the raster data query result to the raster data query, and outputting, via the processing sub-system, the vectorized raster data as the raster data query result to the raster data query,
   wherein the first formatted data is vector data corresponding to linear coordinates and the second data format is a raster data format corresponding to geo-spatial coordinates, and
   wherein the geo-spatial coordinates include a geo-spatial index ($Z_n$) corresponding to a resolution layer (n) indicative of a resolution ($d_n$) of the raster data such that a given geo-spatial index ($Z_n$) at a given resolution layer (n) defines a corresponding geo-spatial location in latitude-longitude space (x, y) as $x_n < x < x_n + d_n$, and $y_n < y < y_n + d_n$ for a given resolution ($d_n$).

2. The computer-implemented method of claim 1, wherein assigning the coordinate values includes:
   receiving the first formatted data having a vector format and including at least one vector object;
   overlaying the grid system on the first formatted data to define a plurality of cells using a processing sub-system including an electronic hardware controller, the grid system including a series of latitude coordinates assigned to a horizontal axis of the grid system and a series of longitude coordinates assigned to a vertical axis of the, grid system, wherein a set of latitude and longitude coordinates defines a cell among the plurality of cells, the plurality of cells being different from the plurality of raster pixels and the at least one filtered pixel;
   identifying, using the a processing sub-system including an electronic hardware controller, a selected cell that contains at least a portion of the at least one vector object; and
   assigning, using a file formatting sub-system, the set of latitude and longitude coordinates of the selected cell to the at least one vector object.

3. The computer-implemented method of claim 2, further comprising:
   determining, via the processing sub-system, timestamp data of the at least one vector object; and
   storing the timestamp data in the dual-format data file.

4. The computer-implemented method of claim 3, further comprising defining a space-time density relationship between the plurality of cells and the first formatted data based on a selected timestamp and a selected set of latitude and longitude coordinates.

5. A computer-implemented method of operating a database system to generate a query result, the method comprising:
   assigning, via a file formatting sub-system including an electronic hardware controller, coordinate values corresponding to a first data format (raster) to data objects included in an initial data set having a second data format (vector) different from the first data format;
   generating a dual-format data file, using the file formatting sub-system, that correlates the data objects having the second data format with the coordinate values corresponding to the first data format to generate a dual-format data file;
   storing, in a data storage unit, the dual-format data file;
   receiving a query for at least one data object included in the initial data set; the at least one data object having the second data format;
   identifying at least one dual-format data file that includes the at least one data object having the second data format from a plurality of dual-data files stored in the data storage unit;
   obtaining, via the processing sub-system; a given dual-format data file in response to a raster data query,
   performing, via the processing sub-system, a geospatial grid reprojection that overlays a grid system on the plurality of raster pixels and assigns geospatial coordinate values to the plurality of raster pixels;
   identifying, via the processing sub-system, pixels corresponding to at least one raster object based on the geospatial coordinate values from pixels excluding at least one raster object and extracting the identified pixels corresponding to the at least one raster object from remaining pixels;
   filtering, via the processing sub-system, the identified raster pixels corresponding to the at least one raster object to define at least one filtered pixel to determine a shapes among a plurality of different types of shapes, the shapes indicative of a raster data query result to the raster data query; and
   performing, via the processing sub-system, an image recognition analysis on the geospatial grid reprojection of the pixels that define the shapes to determine vectorized raster data as the raster data query result to the raster data query, and outputting, via the processing sub-system, vectorized raster data as the raster data query result to the raster data query, outputting the at least one data object based on the corresponding coordinate values stored in the at least one dual-format data file, wherein the first formatted data is vector data corresponding to linear coordinates and the second data format is a raster data format corresponding to goo-spatial coordinates, and wherein the geo-spatial coordinates include a geo-spatial index (Zn) corresponding to a resolution layer (n) indicative of a resolution ($d_n$) of the raster data such that a given geo-spatial index (Zn) at a given resolution layer (n) defines a corresponding geo-spatial location in latitude-longitude space (x, y) as $x_n < x < x_n + d_n$, and $y_n < y < y_n - d_n$ for a given resolution ($d_n$).

6. The computer-implemented method of claim 5, wherein the at least one data object is a vector object selected from the group comprising a point, a line and a boundary shape.

7. The computer-implemented method of claim 6, wherein the coordinate values include sets of latitude and longitude coordinates that index the initial data set to a raster grid system defining a plurality of raster cells, the plurality of raster cells being different from the plurality of raster pixels and the at least one filtered pixel.

8. The computer-implemented method of claim 7, wherein in response to the query, a selected set of latitude and longitude coordinates is determined to identify a selected raster cell that contains the at least one data object.

9. A computer-implemented method of operating a database system to generate a query result, the method comprising:

generating, via a processing sub-system including an electronic hardware controller, a grid system including a plurality of grid cells, and overlaying, the grid cells on an initial data set having a first data format, each grid cell representing data having a second data format and having assigned thereto a set of grid coordinates;

assigning, via a file formatting sub-system including an electronic hardware controller, coordinate values corresponding to the second data format to data objects included in an initial data set having the first data format;

storing, in a dual-format data file, identification information of a selected data object having the first format with a selected set of coordinates corresponding to a selected grid cell that overlies the selected data object;

receiving a query for at least one target data object having the second data format, and generating a reference data object having the first data format based on the query; and outputting the at least one target data object having the second data format based on a comparison between the reference data object and the plurality of grid cells, the comparison comprising: obtaining, via the processing sub-system; a given dual-format data file in response to a raster data query, performing, via the processing sub-system, a geospatial grid reprojection that overlays a grid system on the plurality of raster pixels and assigns geospatial coordinate values to the plurality of raster pixels; identifying, via the processing sub-system, pixels corresponding to at least one raster object based on the geospatial coordinate values from pixels excluding at least one raster object and extracting the identified pixels corresponding to the at least one raster object from remaining pixels;

filtering, via the processing sub-system, the identified raster pixels corresponding to the at least one raster object to define at least one filtered pixel to determine a shapes among a plurality of different types of shapes, the shapes indicative of a raster data query result to the raster data query; and performing, via the processing sub-system, an image recognition analysis on the shapes to determine vectorized raster data as the raster data query result to the raster data query, and outputting, via the processing sub-system, vectorized raster data as the raster data query result to the raster data query, wherein the first formatted data is vector data corresponding to linear coordinates and the second data format is a raster data format corresponding to geo-spatial coordinates, and wherein the goo-spatial coordinates include a geo-spatial index (Zn) corresponding to a resolution layer (n) indicative of a resolution ($d_n$) of the raster data such that a given geo-spatial index (Zn) at a given resolution layer (n) defines a corresponding geo-spatial location in latitude-longitude space (x, y) as $x_n < x < x_n + d_n$, and $y_n < y < y_n + d_n$, for a given resolution ($d_n$).

10. The computer-implemented method of claim 9, wherein the reference data object is defined by at least one set of reference grid coordinates, and outputting, via the processing sub-system, individual grid cells among the plurality of grid cells that correspond to the reference grid coordinates.

11. The computer-implemented method of claim 10, wherein the at least one set of reference grid cells defines boundary shape, and the processing sub-system outputs the individual grid cells contained within the boundary shape.

12. The computer-implemented method of claim 10, wherein the individual grid cells represent raster data selected from a group comprising: census data, weather data, temperature data, soil data, topographic data, soil data, and energy spectral data.

* * * * *